(12) United States Patent
Gotgart et al.

(10) Patent No.: US 10,909,869 B2
(45) Date of Patent: Feb. 2, 2021

(54) METHOD AND SYSTEM TO OPTIMIZE EDUCATION CONTENT-LEARNER ENGAGEMENT-PERFORMANCE PATHWAYS

(71) Applicants: Edward J. Gotgart, Wellesley, MA (US); Christopher C. Moore, Chelmsford, MA (US)

(72) Inventors: Edward J. Gotgart, Wellesley, MA (US); Christopher C. Moore, Chelmsford, MA (US)

(73) Assignees: Edward J. Gotgart, Wellesly, MA (US); Christopher C. Moore, Chelmsford, MA (US)

( * ) Notice: Subject to any disclaimer, the term of this patent is extended or adjusted under 35 U.S.C. 154(b) by 390 days.

(21) Appl. No.: 15/839,406

(22) Filed: Dec. 12, 2017

(65) Prior Publication Data

US 2018/0182256 A1 Jun. 28, 2018

Related U.S. Application Data

(60) Provisional application No. 62/438,096, filed on Dec. 22, 2016.

(51) Int. Cl.
*G09B 5/00* (2006.01)
*G09B 7/04* (2006.01)
(Continued)

(52) U.S. Cl.
CPC .............. *G09B 7/04* (2013.01); *G06F 16/435* (2019.01); *G09B 5/02* (2013.01); *G09B 5/08* (2013.01); *G09B 7/02* (2013.01)

(58) Field of Classification Search
CPC .............. G09B 5/00; G09B 5/10; G09B 5/12
See application file for complete search history.

(56) References Cited

U.S. PATENT DOCUMENTS

2004/0002039 A1* 1/2004 Draper ................ G06Q 10/063
434/118
2009/0047648 A1 2/2009 Ferreira
(Continued)

OTHER PUBLICATIONS

"We Shift Instructional Practice to Create Learner-Centered Classrooms," Retrieved from the internet on Apr. 5, 2013. <https://betterlesson.com/>.
(Continued)

*Primary Examiner* — Peter R Egloff

(57) ABSTRACT

A method and system for the creation, collection, analysis and publication of educational programs, products, practices, policies, and materials, collectively education tools, suitable for describing real-time education content-learner engagement-performance pathways every learner or segments of learners take during an education process. In particular, the method and system create and select direct lessons custom tailored to the interests, needs, and profiles of a target audience with the goal of maximizing learner engagement and performance outcomes. Additionally, the direct lessons clearly explain why the content is valuable, useful today and tomorrow, and relevant to a wide range of people, yet tailored to a target learning audience of having certain characteristics. A relevancy score is created based on a level of performance and application of the information in the direct lessons to provide publishers, educators, or the like with a method and system to track the effectiveness of the education tools.

12 Claims, 8 Drawing Sheets

(51) Int. Cl.
*G09B 5/08* (2006.01)
*G09B 5/02* (2006.01)
*G06F 16/435* (2019.01)
*G09B 7/02* (2006.01)

(56) References Cited

U.S. PATENT DOCUMENTS

| | | | | |
|---|---|---|---|---|
| 2011/0117534 | A1* | 5/2011 | Berger | G09B 5/08 434/350 |
| 2014/0272908 | A1* | 9/2014 | Black | G09B 5/08 434/362 |
| 2015/0058336 | A1 | 2/2015 | Davis et al. | |
| 2015/0064684 | A1* | 3/2015 | Watanabe | G09B 7/02 434/367 |
| 2015/0302755 | A1* | 10/2015 | Breck | G09B 5/12 434/362 |
| 2017/0256172 | A1* | 9/2017 | Kil | G06Q 10/06393 |

OTHER PUBLICATIONS

"Make Lifetime Connections," Retrieved from the internet on Apr. 5, 2018. <https://www.epsilon.com/en_US/home.html>.
"We've Been Helping Clients Fight, arid Win, the Daily Share Battle Since 1968," Retrieved from the Internet on Apr. 5, 2018 <http://www.hhcc.com/>.
Retrieved from the internet on Apr. 5, 2018 <http://ies.ed.gov.ncee/wwc>.
Retrieved from the internet on Apr. 5, 2018 <https://www.itslearning.com/http://info.itslearning.net/VideoOverview.html>.
"You can Learn Anything," Retrieved from the internet on Apr. 5, 2018 <https://www.khanacademy.org/>.
"Introducing Alta, Knewton's Fully integrated Adaptive Learning Courseware," Retrieved from the Internet on Apr. 5, 2018 <https://www.knewton.com/>.
"Digits," Retrieved from the internet on Apr. 5, 2018 <http://assets.pearsonschool.com/customer_central/video/digitsovervew/digits_b_final.html>.
"We are an Independent Customer Experience Agency with Technology at our Core," Retrieved from the internet on Apr. 5, 2018 <http://www.rightpoint.com/>.
"Salesforce for Small Business, Start Instantly on the Out-of-the-Box CRM Built for Small Business Growth," Retrieved from the internet on Apr. 5, 2018 <SalesForce.com>.
"Answer questions as fast as you can think of them with Tableau," Retrieved from the internet on Apr. 5, 2018 <http://www.tableau.com/trial/tableau-software-video?utm_campaign=Prospecting-CORE-ALL-ALL&utm_medium=Paid+Search&utm_source=Google+Search&utm_language=EN&utm_country=USCA&kw=tableau&adgroup=CTX-Brand-Core-E&adused=104589996975&matchtype=e&placement=&kcid=32277be5-38eb-e788-bafa-00004777f9ae&gclid=CKCJ0KmU9NACFZiCswod-NAPKQ>.
"The Smarter Video Platform for Higher Education and Continuing Ed," Retrieved from the internet on Apr. 5, 2018 <Echo360.com>.
"Imagine Math," Retrieved from the internet on Apr. 5, 2018 <https://www.thinkthroughmath.com/contact-us/>.

* cited by examiner

METHOD AND SYSTEM TO OPTIMIZE EDUCATION CONTENT-LEARNER ENGAGEMENT-PERFORMANCE PATHWAYS

CROSS-REFERENCE TO RELATED APPLICATION(S)

This application claims priority to, and the benefit of, U.S. Provisional Application No. 62/438,096, filed Dec. 22, 2016, for all subject matter common to both applications. The disclosure of said provisional application is hereby incorporated by reference in its entirety.

FIELD OF THE INVENTION

The present invention relates to the creation, collection, analysis and publication of educational materials suitable for describing real-time education content-learner engagement-performance pathways every learner or segments of learners take during the education process. In particular, the present inventive system correlates education content with learner engagement and overall educational effectiveness of educational programs, products, practices, policies, tools and materials, for use by publishers, educators, or the like, to understand how various combinations of the variables lead to the best possible performance outcomes and to optimize those outcomes for each individual learner in real time.

BACKGROUND

Generally, conventional educational programs, products, practices, policies, tools, and materials do not offer the capability for instructors to evaluate and understand the unique education content-learner engagement performance path(s) each individual learner takes during the education process. Such conventional educational solutions (programs, products, practices, policies, tools, and materials) include text books, lesson plans, online educational content, educational videos, educational games, teaching strategies, adaptive learning solutions, etc. As a result, when utilizing conventional instructional solutions, instructors lack the ability to determine what solutions, or combination of solutions will have the highest likelihood of success with each and every learner, or collectively in a group audience (e.g., a classroom of learners). The tactic of guessing at what might work is a time-consuming and costly trial by error process that leads to buying expensive "all-in" programs, unsatisfactory return on investment (ROI), and excessive learner disengagement. Today, instructors are forced to guess at what materials and methodologies might work for a given audience at any given point in time. The United States Department of Education's What Works Clearinghouse attempts to address this need. However, it is limited by its centralized, review-of-research approach.

Conventional educational materials are designed to convey/teach information followed by the use of traditional testing tools to determine the degree to which generalized audience members (e.g., learners or students) understood the content. Such products do not solicit, receive, evaluate or incorporate end user input to make the products useful and relevant equally to all users, in real time. Developers of educational content are not aware of the valuable information that can be gleaned from deeply understanding how different people interact with, and relate to, their content at the individual lesson experience level prior to traditional testing. Therefore, they design one-size-fits-all products that are static with a generic single-purpose application.

The ability to analyze and understand in real time how specific learners or segments of learners engage with educational content during the learning process itself does not exist in educational systems today, which means an entire body of valuable insights is not available to instructors, or to developers of educational content. Educators know everything about the academic performance of students, but they know nothing about the performance of their instructional materials. The absence of such knowledge greatly limits their ability to effectively purchase, implement, teach and maintain educational content on behalf of each and every student. Furthermore, if content providers knew about the valuable data that could be captured and resulting insights, and decided to create this capability, they would be faced with the daunting prospect of re-designing their products from scratch. Overall, instructors and educators lack the capability to continuously measure, evaluate and understand student-curriculum relationships in real time. Academic performance is only one small facet of this overall relationship and does not provide the insights needed to optimize the curriculum for maximum performance, in real time, all the time.

SUMMARY

There is a need for improvements to how educational materials are created, collected, analyzed and published in a manner useful for instructors of different collections of learners. The present invention is directed toward further solutions to address this need, in addition to having other desirable characteristics. Specifically, the present invention is designed to create educational content that clearly explains why the content is valuable to the learner audience, useful today and tomorrow, and relevant to a wide range of people, yet tailored to a target learning audience of having certain characteristics. The present invention provides educational content that is directly related to interests of a target learning audience and deemed to be successful in teaching similar learning audiences, all in real time.

In accordance with example embodiments of the present invention, a method for creating direct lessons is provided. The method includes identifying a target audience profile, creating one or more questions, assigning at least one interest topic to the one or more questions, and supplementing the one or more questions with authentic data from one or more remote data sources. The method also includes creating problems tied to the at least one interest topic, selecting either a class or homework designation for the one or more questions, and determining a new vocabulary needed and define for terms in the one or more questions. The method further includes writing a short passage that explains why a learner should be interested in the one or more questions, writing learner and teacher instructions for the one or more questions, writing a re-cap for how the one or more questions are relevant to the learner, and writing test problems for learners to complete.

In accordance with aspects of the present invention, the target audience profile includes at least one of gender, age, demographics, education level, location, and economic status. In accordance with aspects of the present invention, the authentic data is both numeric and non-numeric data. In accordance with aspects of the present invention, the method includes developing multiple calls to action opportunities.

In accordance with example embodiments of the present invention, a method for generating information transfer relevancy score (ITRS) scale is provided. The method includes aggregating student profile data, school profile data, community demographic data, and direct lesson usage data. For each direct lesson, aggregating academic performance data, student ratings, and teacher ratings. The method also includes calculating an ITRS score for each direct lesson based on the student profile data, the school profile data, the demographic data, the direct lesson usage data, the academic performance data, the student ratings, and the teacher ratings. The ITRS scale indicates a level of engagement-performance outcomes for a given direct lesson for a given student segment.

In accordance with example embodiments of the present invention, a system for creating a direct lesson is provided. The system includes a learning experience optimization methodology tool configured to guide a user through creation of the direct lesson. The guiding includes prompting the user for identification of a target audience for the direct lesson, the target audience including one or more interest topics, prompting the user for a question tied to an interest topic, and determining that authentic data is available for answering the question. The guiding also includes prompting the user for a value proposition as to why the target audience, prompting the user for a re-cap for how the question is relevant to the target audience, and prompting the user for test problems for the target audience to complete. The guiding further includes creating the direct lesson from a combination of the identification of the target audience, the question, the authentic data, the value proposition, the re-cap, and the test problems and a direct lesson data library configured to store the direct lesson with a plurality of direct lessons accessible by user portal.

In accordance with example embodiments of the present invention, a method for determining optimal direct lessons in real-time is provided. The method includes aggregating direct lesson feedback data for one or more direct lessons from a plurality of remote participant audiences. The direct lesson feedback data includes participant audience descriptors, the participant audience descriptors defining classifications for the participant audience submitting the direct lesson feedback data for the one or more direct lessons, instructor ratings and student lessons for the one or more direct lessons, and performance data of the participant audience having conducted the one or more direct lessons. The direct lesson feedback data is based on input received in response to the participant audience conducting the one or more direct lessons, evaluating a level of effectiveness of the one or more direct lessons based on a combination of, the instructor ratings, the student lessons, and the performance data, receiving, from the user, a selection of a target audience, the target audience comprising predetermined participant audience descriptors. The method also includes providing, to a user, a plurality of criteria filters, each criteria filter comprising sub-criteria each associated with the one or more direct lessons, receiving, from the user, a selection of a sub-criteria for each of the criteria filters, and applying the selected sub-criteria as filters to the one or more direct lessons. The method further includes providing, to the user, a filtered group of direct lessons from the one or more direct lessons based on the filters, providing a relevancy score for each direct lesson in the filtered group of direct lessons, the relevancy score correlating the level of effectiveness to the direct lesson feedback data provided by participant audiences and academic performance data by the participant audiences sharing similar participant audience descriptors of the target audience, receiving, from the user, a selection of a direct lesson from the filtered group of direct lessons, and adding the direct lesson to a lesson portfolio associated with the user.

In accordance with aspects of the present invention, the method also includes upon completion of the direct lesson, receiving new direct lesson feedback data from the user for the direct lesson and updating the direct lesson feedback data to include the new direct lesson feedback data. The method can also include receiving a target threshold value for the academic performance of the direct lesson and providing an alert to the user when the academic performance data for the direct lesson, based on the updating, falls below the target threshold value.

In accordance with example embodiments of the present invention, a method for selecting an optimal lesson for a plurality of learners is provided. The method includes selecting a target audience for the lesson, selecting a target subject matter, selecting an educational standard for the target subject matter, and selecting at least one interest topic for at least one student of the plurality of learners. The method also includes selecting a difficulty level, selecting a range of scores from an information transfer relevancy score (ITRS) scale, selecting at least one direct lesson from a list of direct lessons automatically generated based on the target audience, the target subject matter, the educational standard, the at least one interest topic, and the range of scores, and adding the at least one direct lesson to a lesson portfolio.

In accordance with aspects of the present invention, the method also includes updating the at least one direct lesson with current data. In accordance with aspects of the present invention, the at least one interest topic is selected from a plurality of interest topics created based on student submitted interests. In accordance with aspects of the present invention, the method also includes rating, by at least one instructor, an effectiveness of the at least one direct lesson and ratings, by one or more learners, an effectiveness of the at least one direct lesson. In accordance with aspects of the present invention, the ITRS scale is a relevancy score based on the target audience, the target subject matter, the educational standard, the at least one interest topic and a level of effectiveness of direct lessons based at least in part on the rating provided by the at least one instructor and the ratings provided by the one or more learners, academic outcomes, and profile of schools who have had success with given direct lesson. In accordance with aspects of the present invention, the method further includes assigning a unique identifier to the at least one direct lesson, wherein the unique identifier is utilized to track each instance of the at least one direct lesson.

In accordance with aspects of the present invention, the system for filtering and selecting relevant direct lessons from a direct lesson data library is provided. The system includes a direct lesson data library configured to store a plurality of direct lessons accessible by user portal, a direct lesson selection utility tool configured to filter the plurality of direct lessons from a direct lesson data library/The filtering includes prompting a user for a selection of a target audience, prompting the user for a selection of a subject matter, prompting the user for a selection of an education standard, and prompting the user for a selection of one or more interests for the target audience. The filtering also includes prompting the user for a selection of a selection of a relevancy score range, providing the user a list of direct lessons matching criteria for the selected target audience, the subject matter, the education standard, the one or more interests, and the relevancy score range, and prompting the user for a selection of at least one direct lesson from the list of direct lessons. The system also includes a direct lesson portfolio associated with the user, the portfolio configured to store the selected at least one direct lesson.

In accordance with aspects of the present invention, a method is provided. The method includes generating a plurality of target audience classifications, receiving a selection of a target audience of the plurality of target audience classifications, and generating a plurality of target subject matters based on the received target audience. The method also includes receiving a selection of a target subject matter from the plurality of target subject matters, generating a plurality of educational standards based on the target subject matter, and receiving a selection of an educational standard for the target subject matter. The method further includes generating a plurality of interest topics based on student reported interests, receiving a selection of at least one interest topic for one or more target learners, generating a plurality of ranges of scores for an information transfer relevancy score (ITRS) scale, and receiving a selection of a range of scores from the information transfer relevancy score (ITRS) scale. The method includes generating a list of direct lessons based on the target audience, the target subject matter, the educational standard, the at least one interest topic, and the range of scores and receiving a selection of at least one direct lesson from the list of direct lessons.

In accordance with aspects of the present invention, a system for determining an information transfer relevancy score for a direct lesson is provided. The system includes an enrichment data staging area configured to aggregate input data for the direct lesson, the input data including learner profile data, school profile data, demographic data, direct lesson usage data, academic performance data for the direct lesson, and learner teacher ratings, a direct lesson data library configured to store a plurality of direct lessons accessible by user portal, and an information transfer relevancy score tool configured to deriving the relevancy score for the direct lesson. The deriving includes sourcing the input data from the enrichment data staging area and combining the input data to form a plurality of information transfer relevancy scores, each of the plurality of information transfer relevancy scores is for each usage of the direct lesson. The deriving also includes averaging the plurality of information transfer relevancy scores to create a single information transfer relevancy score for the direct lesson and providing the information transfer relevancy score for the direct lesson to the direct lesson data library for updating.

In accordance with aspects of the present invention, each usage of the direct lesson is associated with a unique identifier and the unique identifier is utilized to track the input data each usage of the direct lesson combination in the information transfer relevancy score.

In accordance with example embodiments of the present invention, a system for creating an education transaction, which is a single (one) instance of the education content-learner engagement-performance pathway is provided. The system includes a tool to inventory content used by an educator to teach a given subject resulting in a unique identifier for every teaching material, whether it be a lesson, teaching methodology, educational program, game, or any other material used in the teaching learning process, whether it be print, electronic or any other delivery vehicle. The system also includes an online tool for students to individually respond to and rate their experiences with a single piece of education content or any education experience resulting from the actions of an educator. The system further includes a library of performance assessments tied directly to the inventory of education content.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
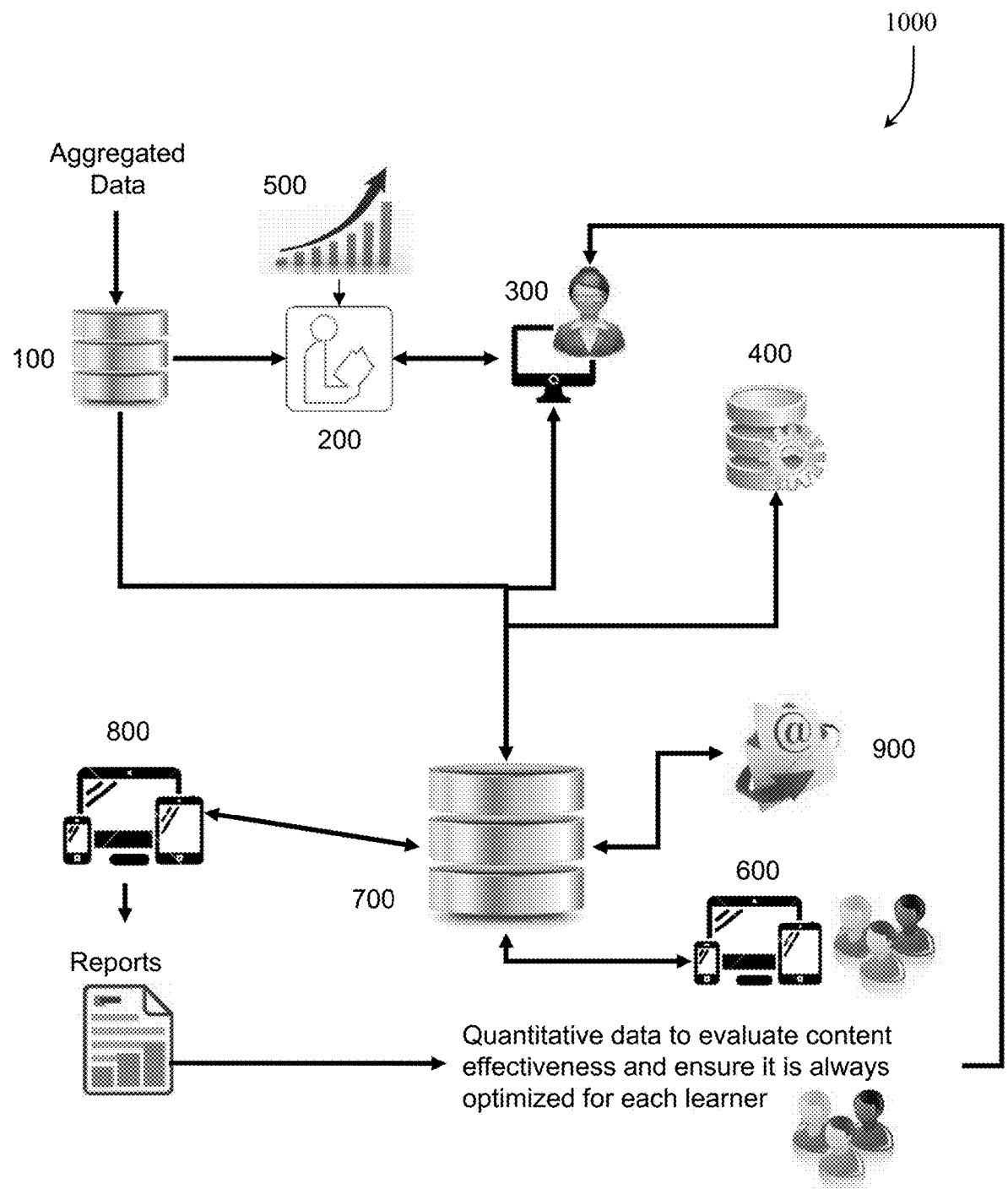
FIG. 1 is an illustrative system architecture for implementing the processes in accordance with the aspects of the invention.

An illustrative embodiment of the present invention relates to the creation, collection, analysis and publication of transactional data that describe real-time education content-learner engagement-performance pathways for every learner (e.g., student) or segments or audience of learners (e.g., classroom of students) take during the education process. More specifically, the present inventive system correlates education content (e.g., instructional content) with learner engagement and overall educational effectiveness of the educational materials, for use by publishers, educators, or the like, to understand how various combinations of the variables lead to the best possible performance outcomes and to optimize those outcomes for each individual learner in real time. One critical aspect of the education content-learner-engagement-performance pathway is the ability of the system to capture a single instance of the pathway. A single instance of the pathway can be thought of as an education transaction which is any education event that initiates the accounting process of recording it in an education institution's database system.

The present invention offers five unique components that are not provided by traditional educational materials, methodologies, and systems. First, the present invention provides direct lessons that enable instructors to offer interest-based content to their learners so that all learners are equally engaged and interested in learning all the time. Second, the present invention provides a derived relevancy score that is associated with every lesson-audience segment so that instructors can select direct lessons that are most relevant to their specific audience needs and interests, and will have the highest likelihood of academic success based on historical success from existing users in like segments of learners or groups of learners. Third, the present invention provides a user interface that enables instructors to create and maintain portfolios of direct lessons that are optimized for relevance and performance. Fourth, the present invention provides learners with their own portal to provide real time feedback describing the interactions they have with education content so that they have an active voice as to how the education content is purchased, taught, implemented and maintained on their behalf. Lastly, the present invention provides a platform that seamlessly connects the above-mentioned components together. Additionally, the present invention provides a communication platform that enables data from the invention to drive highly relevant and useful dialog with the user base.

The present invention provides a unique collection of direct lessons that include education content organized by interests of an audience as well as satisfying educational standards. This unique combination of direct lessons and associated interests enables instructors to identify a subset of lessons that are aligned with the interests of their audiences. This is one aspect of the present invention that allows the system to optimize lessons to best educate the particular audience on a given subject. Additionally, the direct lessons are formulated utilizing a unique learning experience optimization (LEO) methodology. The LEO is a development methodology used for the creation of direct lessons in a manner that ensures a consistent product is created, regardless of the person developing the content. The creation of the direct lessons utilizing the LEO provides an answer to the question, "of all the lessons available based on my learner interests, which ones will have the highest likelihood of success, measured by engagement and performance, with my unique student audience?"

The present invention further includes a learner access portal to collect feedback on direct lessons to further optimize a level of effectiveness for those direct lessons based on that feedback. The learner access portal is an online place where learners will want to visit frequently so that they can have a voice into how education content (and direct lessons) is purchased, implemented, taught and maintained, on their behalf. The learner access portal is the place where feedback data is collected to correlate direct lesson relevance to an audience with performance to provide a clear picture of the unique engagement path for every learner. The learner access portal and other enrichment data is provided to 1) drive direct lessons and audience segmentation/profiling (e.g. publicly available demographic or school profile data) and 2) create audience segments and understand profiles of each. This combination of data is used as an input into an information transfer relevancy score (ITRS) relied upon instructors for selecting which direct lessons are most suitable for their particular audience's academic success. Additionally, the learner access portal provides communication between the learners, instructors, and content providers. The communication leverages user data en masse to inform individual instructors of purposeful, relevant and interesting facts around how instructors with a similar profile are using the invention to maximize learner outcomes.

FIGS. 1 through 8, wherein like parts are designated by like reference numerals throughout, illustrate an example embodiment or embodiments of improved operation for learner engagement through correlating educational materials to a target audience of learners in real time, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an exemplary system architecture 1000 for the present invention. In particular, FIG. 1 depicts how the various components are combined to produce data for instructors to evaluate the effectiveness of educational content in real time for each learner. As used herein the terms educational content, education events, educational materials, educational initiatives, educational solutions, and educational intervention (collectively "education content") are used interchangeably to define any educational substances, methods, and systems implemented by educators and educational institutions for purposes of providing instructional content, educating knowledge seekers, and/or administering and/or implementing such educating activities. These education tools can include, but are not limited to, programs, products, practices, policies, materials that are utilized by educational professionals to deliver educational content to students. In other words, these terms can include any methods, products, services, devices, technology, or other conveyances educators utilize to teach students certain topics. The system architecture 1000 is designed to evaluate the effectiveness for each type (including different content within each type) of educational tool. Depending on the specific implementation (e.g., program, product, practice, material, etc.), the system architecture 1000 is capable of in-taking the relevant data for the implementation and outputting the evaluation of effectiveness of the education initiative as described herein. The system architecture 1000 includes an enrichment data staging area 100, a direct lesson data library 200, a direct lesson selection utility tool 300, an information transfer relevancy score processing engine 400, a learning experience optimization (LEO) methodology tool 500, and a learner access portal 600.

The enrichment data staging area 100 is a data aggregation process and system for storing data related to education provider data (e.g., audience segment, school, and community profiling data) and educational related content (e.g., authentic data for direct lessons 214 and data applications). The data aggregation by the enrichment data staging area 100 is an automatic process that has links to pre-defined freely available numeric and non-numeric data locations from the Internet, which are pre-selected by user defined criteria. For example, a user can add uniform resource locator (URL) locations as source locations for the enrichment data staging area 100 as locations are identified via online data exploration.

In operation, the enrichment data staging area 100 is a data management system that automatically checks pre-defined locations on the Internet for numeric and non-numeric data. The enrichment data staging area 100 aggregates and updates numeric and non-numeric data to be utilized as source data for the creation of direct lessons 214, as discussed in greater detail herein. A data update process will be run periodically and is considered a required maintenance process for the system 1000. In particular, the enrichment data staging area 100 accesses predetermined data locations on a periodic basis (depending on update frequency of raw data) to check for updates to previously aggregated datasets. When an update is available, the enrichment data staging area 100 downloads the newest dataset and updates its database(s) accordingly. Specifically, when an update is available, the enrichment data staging area 100 performs an extract, load and transformation (ELT) process based on computer language code. The code is customized to each data source (e.g., each URL). For new datasets that are defined, manual intervention is needed to initialize the data and create the ELT code. Once ELT has been performed, the data is automatically posted to a staging area where it will be exported to the central database 700. As would be appreciated by one skilled in the art, the manner in which ELT is performed will depend upon how education content in the direct lesson data library 200 use the ELT data.

Figure 2:
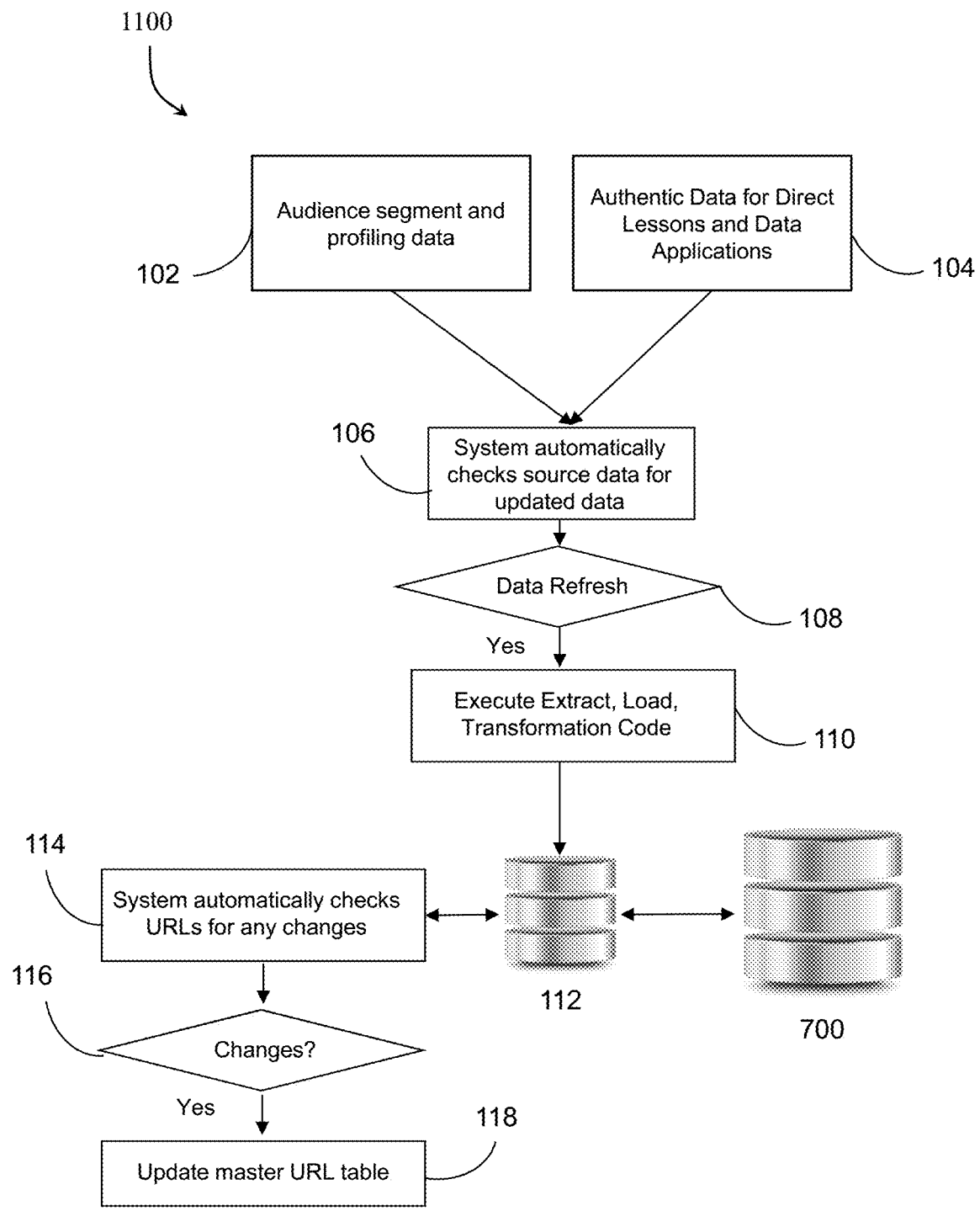
FIG. 2 is an illustrative flowchart depicting operation of an enrichment data staging area, in accordance with aspects of the invention.

FIG. 2 depicts an exemplary process 1100 for the operation of the enrichment data staging area 100 by which authentic numeric and profile data are automatically accessed and downloaded into the central database 700 for use in direct lessons 214, learner access portal 600, ITRS, insight 800 dashboard and other data applications. In particular, the process 1100 depicts what types of datasets are aggregated and how those datasets are aggregated and updated. Initially, datasets are aggregated from one or more types of data sources. In accordance with an example embodiment of the present invention, two types of datasets are obtained from two data sources. The two data sources include categories of datasets for audience segment and profiling data (obtained at step 102) and authentic data for direct lessons 214 and data applications (obtained at step 104). The audience segment and profiling data includes aggregating data about a target audience at an education facility. For example, the audience segment and profiling data can include school profiles, student profiles, demographic data, etc. for a target audience. The authentic data for direct lessons 214 and data applications is data related to various topics of educational content. For example, the authentic data for direct lessons 214 and data applications can include data related to Australia, China, India, Europe, consumers, economics, industry, occupations, oceanic, climate change, banking, sports, popular music, federal debt, prison, transportation, U.S. water table, hydroelectric, volcanoes, planets, moons, natural resources, state data, environment, public safety, municipal, housing, health, geographic, atmospheric, medical, technology, research, agriculture, financial, Forests, fish stocks, the world bank, glaciers, etc. Within each category, there are multiple datasets for exploration and potential use within the present invention.

At step 102 predefined categories of datasets from the sources for audience segment and profiling data are aggregated and are used to identify profiles and interests of individual learners and learner segments. For example, the dataset from step 102 could indicate that learners/students in the McCarthy Middle School in Chelmsford, Mass. are 2.6% Hispanic and 81% plan to go to college. 34% are eligible for free or reduced price lunch. 33% of 7th graders are interested in climate change. Industries with most jobs are manufacturing and health. 72% find education content in school interesting to them. 64% think it is relevant to their lives. The data from the datasets in step 102 provides the system 1000 with data regarding the unique content-engagement-performance pathways each student experiences over time. Specifically, the data enable users to understand content-engagement-performance pathways at the individual learner or learner segment(s) level. In other words, data from the data source 102 answer the question, "What is the engagement-performance pathway for student A or learner segment X now and how has it changed over time?"

Similarly, at step 104 of the process 1100, the enrichment data staging area 100 checks the source data locations for data updates related to authentic data for direct lessons 214 and data applications. The datasets collected in step 104 are used for data inputs for direct lessons 214 and utilities for exploring large, complicated datasets or combinations of datasets. In particular, datasets from step 104 are sourced from hundreds of URL locations from the Internet from a variety of formats. For example, the datasets can be sourced from Excel, Asci, or other formats that can be easily downloaded and prepared for processing in a database related system. The datasets aggregated in step 104 provide the raw data needed to make learning experiences from the invention real, relevant and engaging. Furthermore, the data enable direct lesson data library 200 to be sorted by topical areas of interest and includes information related to those topical areas, as discussed in greater detail herein. For example, dataset related to bridges can contain information on more than 600,000 bridges across the United States. The datasets aggregated in step 104 includes numeric data that can used to provide math exercises in individual direct lessons 214, which is prepared in advance by the developer of the direct lessons 214.

At step 106, the process 1100 checks for updates to the datasets aggregated in steps 102, 104. The data sources being checked are pre-defined and performed automatically by the system. As would be appreciated by one skilled in the art, each input dataset from steps 102, 104 has its own update frequency which is determined during the initial set up of data. Additionally, the checking process at step 106 ensures that the system 1000 knows when datasets are updated to avoid downloading repetitive data.

At step 108 the process 1100 initiates a data refresh when the system 1000 has detected a new update at step 106. In particular, at step 108, the process 1100 initiates a download of the updated data from step 106 into a staging area for additional processing at step 110. Additionally, if parsing of the data is required, for example with asci data, it is performed at step 108. The parsing includes the task of converting the raw data into fields and tables that are used by the central database 700 (where the data will reside upon completion of the process 1100).

At step 110 the process 1100 initiates an automatic process that executes the pre-defined ELT (extract, load, transformation) code for each dataset. The code is unique to each dataset and entails processing activity such as performing data error checking, creating math examples, exercises and homework for use in direct lessons 214 and updating the main database 112 of the enrichment data staging area 100. In particular, the database 112 is intermediary data storage area for enrichment data staging area 100 and is the location for all finalized data after process 110. The database 112 serves as the location for quality control of all import data from steps 102 and 104. In accordance with an example embodiment of the present invention, an execution program automatically checks the data in the enrichment data staging area 100 every time a data refresh occurs at step 108. If any data issues are identified, a data analyst is notified for problem identification and corrective action. If the refresh is successful without any issues, the data are automatically exported to the central database 700 for storage and accessible by the other components of the system 1000.

At step 114 the process 1100 automatically checks, prior to any data refresh 108, to determine if the URL link for the source data is still active and accurate. The process 1100 checks a predetermined list the URL sources for all the import data for steps 102 and 104. If the URL link for the source data is still active and accurate, then the processing continues. If not, a database administrator is notified for corrective action. In an example embodiment, manual intervention is also needed to update and maintain the URL list utilized in step 114. For example, when a source URL for a dataset has changed, human intervention is required to update the code that manages the check process at step 106. Similarly, if a new input dataset is added for aggregation at steps 102 or 104, the code also needs to be updated to reflect the addition of a new dataset.

Step 116 is an optional step in the process 1100 that determines if the URL link for the source data is still active and accurate. In particular, at step 116 the process 1100 determines what the changes are in a URL. For example, a database administrator can be notified to determine the source of the problem and perform the appropriate corrective action at step 118. The corrective action at step 118 can include a manual change to the master URL table discussed at step 114. The combined steps of 114, 116, and 118 in the process 1100 ensure that the master URL table is up to date and correct, such that the data aggregated and updated at steps 102-110 is always up to date and accurate.

The data aggregated by the enrichment data staging area 100 in steps 102 and 104 can be made of a number of different datasets and will always be growing and expanding to reflect the changing nature of society as it is described in both numeric and non-numeric data. Accordingly, the enrichment data staging area 100 is dynamic. In other words, the process 1100 for the enrichment data staging area 100 is what makes the education content in the invention dynamic, as compared to static content that never changes. As the source data are updated by the creator of the data, so too does the data in the enrichment data staging area 100, which means the invention is keeping pace with changes in the world as they are described via data, thereby making the content up to date.

In contrast, traditional education content, on occasion, references a dataset, makes a copy of it and uses it for learners in a lesson, activity or exercise. In this application, the data, which are static, are used as an example to enrich the acquisition of knowledge, for example math. The data may be updated when the publisher creates a new version or edition of the product being used, but usually not. Furthermore, only a small fraction of the available data is used and due to the deployment of the data, they are typically aged by many years. This approach has, for example, in part, led to math being taught as an objective and not a strategy one uses in life or business to perform useful, meaningful tasks. In contrast, the present invention describes a massive database of complex, dynamic, seemingly unrelated data that together drive the creation of direct lessons 214. It is a tool for learners to use what they are learning (whatever that may be—math for example) and explore real world, authentic data this is up-to-date. In the process, they discover useful information that they can use in their lives in a useful, productive way.

Continuing with FIG. 1, the direct lesson data library 200 of the system 1000 is a repository of education content (e.g., instructional content, education events, direct lessons, etc.) that is developed and enriched by the data aggregated and updated by the enrichment data staging area 100, as discussed in greater detail herein. The direct lesson data library 200 includes education events that are specifically designed (e.g., using the learning experience optimization methodology tool 500) in such a way that it can be aligned to specific needs or interests of a segment or segments of an entire audience (e.g., plurality of learners or students). This capability allows for a level of performance analysis that cannot be accomplished by traditional one-size-fits-all education content. For example, a traditional $8^{th}$ grade math book is designed for any $8^{th}$ grade student learning math anywhere and does not take into consideration variances in the audience (e.g. gender, location, school setting). In contrast, a given direct lesson 214 created and stored in the direct lesson data library 200 enables instructors to select direct lessons 214 based on the interests (e.g. agriculture) of their particular student audience. When direct lessons 214 stored in the direct lesson data library 202 are coupled with an ITRS, instructors can match content with audience segments (e.g., male, Iowa, rural, native American, reduced lunch) and also have confidence that it will yield desired results (e.g. student engagement and academic outcomes). Furthermore, this combination of components quickly helps instructors narrow down an ever-growing list of direct lessons 214 stored in the direct lesson data library 200 into particular direct lessons 214 that are likely to work best with their learners (e.g., direct lessons 214 that are effective to the characteristics of the student audience). With these new data elements, instructors can better analyze the effectiveness of their education content and make changes as needed in real time to ensure optimal performance.

Figure 6:
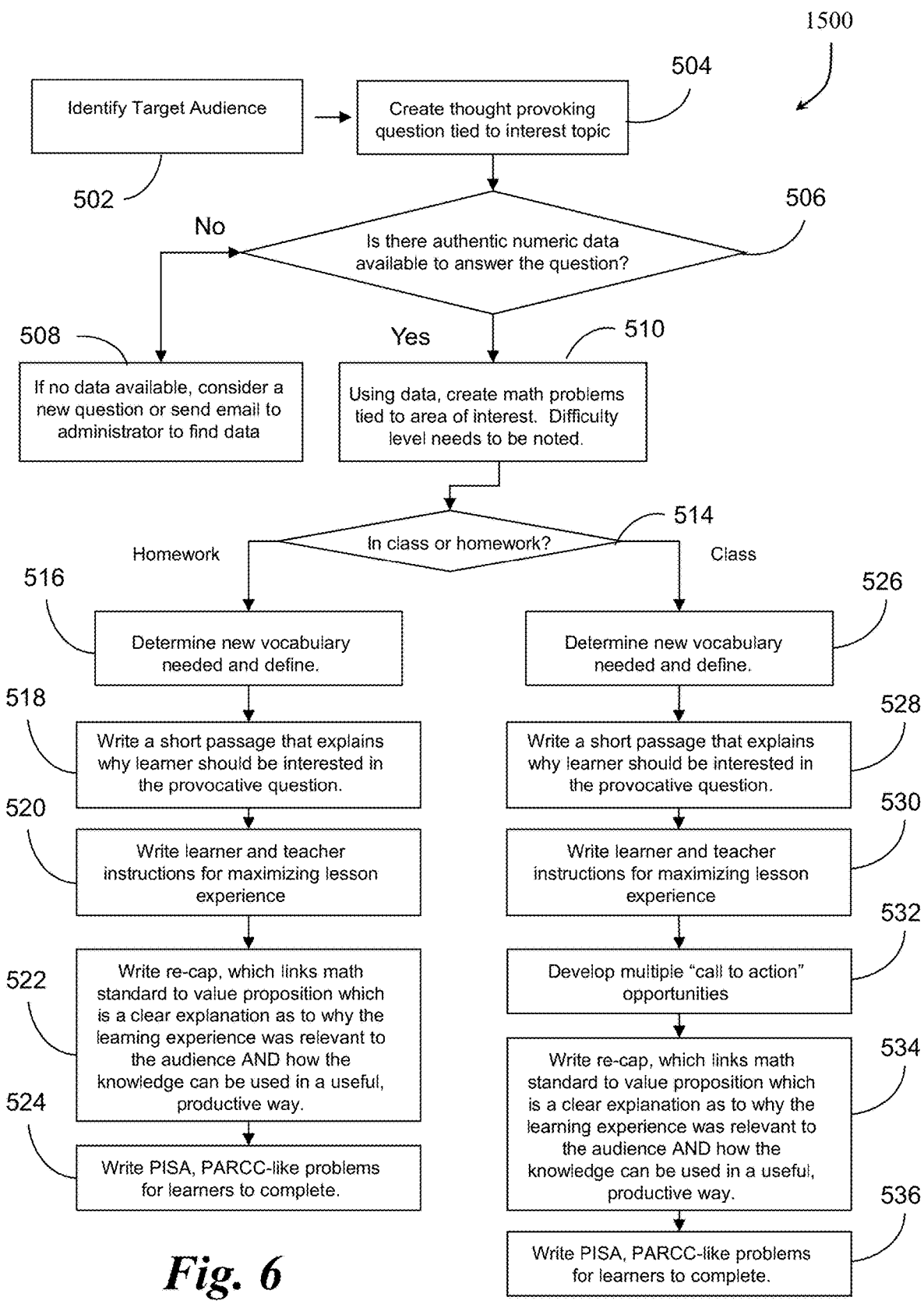
FIG. 6 is an illustrative flowchart depicting operation of learning experience optimization methodology tool, in accordance with aspects of the invention.

In operation, in an example embodiment of the present invention, the direct lessons 214 stored in the direct lesson data library 200 are created by users utilizing the learning experience optimization methodology tool 500 (discussed in greater detail in FIG. 6). In particular, users of the present invention (Business content developers or Instructors) create direct lessons 214 and upload the created direct lessons 214 to the system 1000 for review by the business that uses the present invention. If the uploaded direct lessons 214 pass a review process, then they are made available to the user base (e.g., instructors, learners, etc.). For direct lessons 214 that require modification resulting from the review process, a notification is transmitted to the user who uploaded the direct lesson 214 that modifications are needed. Additionally, specific details for the required modification will be provided to the user. When direct lessons 214 are created, uploaded, and approved, they are stored and tagged for marketing purposes and easy retrieval by all users in the direct lesson data library 200. For example, a new direct lesson 214 that uses health data can be tagged with the following identifiers: $8^{th}$ grade, math, linear equations, and common core standard 55 (i.e., Health—Food Calories). The identifiers enable users to quickly select the direct lesson for learners who are interested in Health-Food Calories and are learning linear equations in $8^{th}$ grade.

Figure 3:
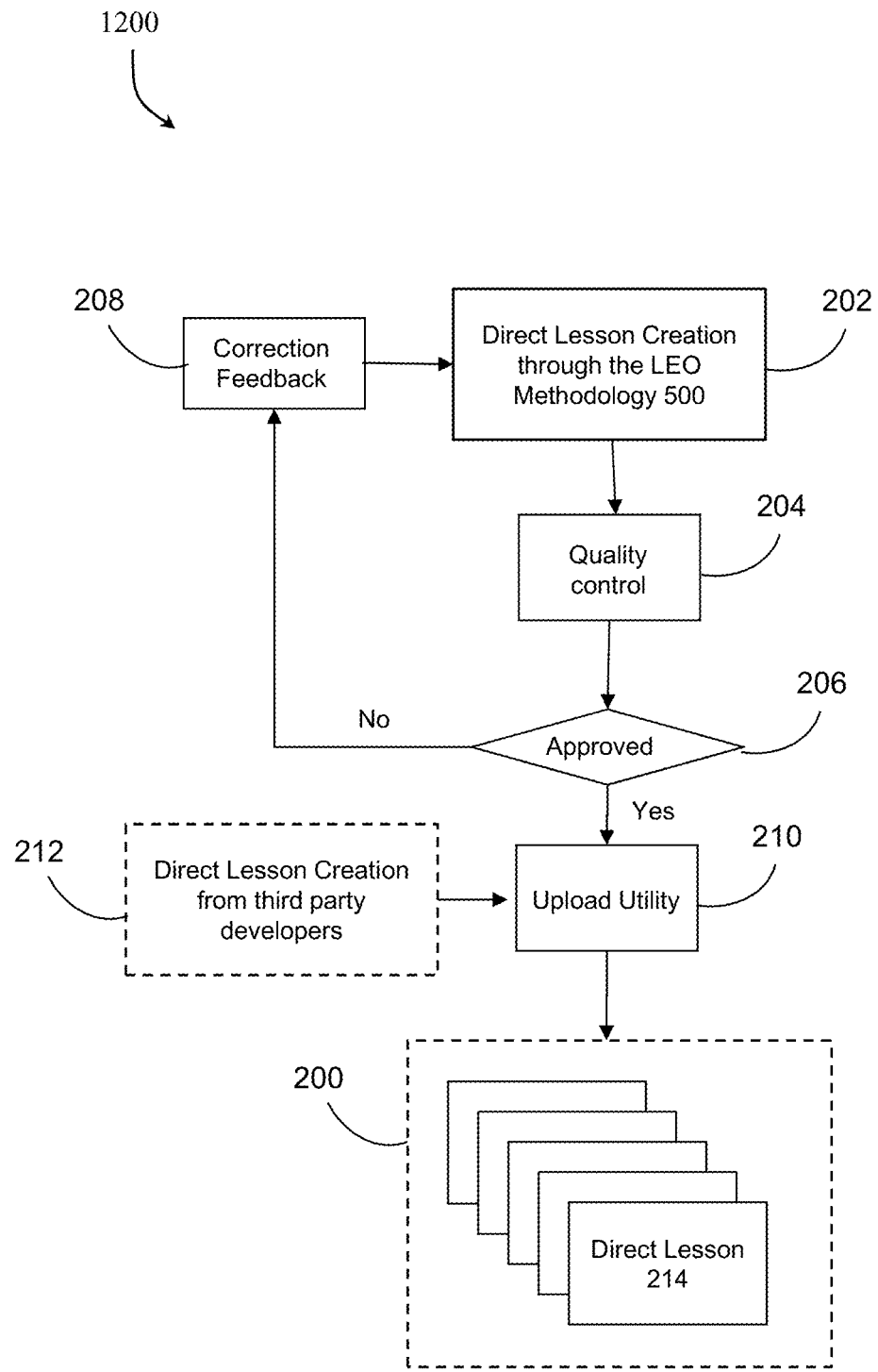
FIG. 3 is an illustrative flowchart depicting operation of a direct lesson data library, in accordance with aspects of the invention.

FIG. 3 depicts a flowchart depicting a process 1200 for how direct lessons 214 are created and uploaded into the direct lesson library, where they are used by instructors to engage every learner at any time. In particular, the process 1200 describes how direct lessons 214 are uploaded to the direct lesson data library 200 for use by the other components in the system 1000 (e.g., by the direct lesson selection utility tool 300). The process 1200 is a process for creating direct lessons 214 by relying upon the steps provided in learning experience optimization methodology tool 500, as discussed with respect to FIG. 6. The difference between the steps in process 1200 and the steps in traditional lesson creation is in the difference in the lesson components. For example, traditional lessons follow a development methodology that introduces an educational standard, explains what it means, provides practice and exercises and then concludes with testing to evaluate the knowledge acquired. Direct lessons 214 created in accordance with the present invention have these components as well, but they also have a thought-provoking introductory question, topic of interest, authentic, dynamic numeric data, value proposition for learning the educational concept, answer to the question, "Why is this important to the learner," and a call to action (meaning what you can do with the knowledge today in your life). Each of these components is created and stored within the direct lesson data library 200. Using these new data elements within a direct lesson 214, instructors have new criteria that can be used to align education content with the needs and interests of individual learners or learner segments. Additionally, performance metrics can be tracked and associated with the direct lessons 214 within the direct lesson data library 200 to reflect which direct lessons 214 are most effective for particular audience characteristics. Traditional lessons do not afford this capability, and therefore, the result is the one-size-fits-all products on the market today that can't be aligned to individual learners or learner segments to determine what works and with whom.

At step 202 the direct lessons 214 are created by one or more users. In accordance with an example embodiment of the present invention, the direct lessons 214 are created utilizing the learning experience optimization methodology tool 500, which provides a guide that direct lesson content developers use to create direct lessons 214. A full description of the learning experience optimization methodology tool 500 is discussed in greater detail with respect to FIG. 6. As would be appreciated by one skilled in the art, any methodology for creating direct lessons 214 could be utilized without departing from the scope of the present invention. In accordance with an example embodiment of the present invention, content creators can be divided into two separate groups of users. The first group of users is content developers that are not part of the business entity that provides the product form of the present invention to instructors. The second group of users includes end users such as instructors, teachers, publishers, professional writers, and professional associations that use the present invention to create direct lessons 214. Both groups of users are sources of the direct lessons 214 that populate the direct lesson data library 200.

At step 204 the quality control process is performed by quality control users (e.g., system administrators) on the direct lessons 214 created in step 202. For example, the first group of users can be administrative users that have permissions to review direct lessons 214 and act as quality control reviewers for all created direct lessons 214. All content, whether it was created by the first group of users or the second group of users passes through quality control at step 204. In particular, at step 204 the direct lessons 214 are checked for compliance with the predetermined criteria for the direct lessons 214 (e.g., the criteria from the learning experience optimization methodology tool 500). The verification in step 204 ensures that each direct lesson 214 has all the appropriate components and that they meet minimum criteria for acceptance into the direct lesson data library 200. Step 204 also protects the overall integrity of the invention as they serve as a major variable in optimizing the education content-learner engagement-performance pathways. As would be appreciated by one skilled in the art, based on the predetermined criteria, step 204 can be a fully automated verification process (e.g., comparison/matching algorithms) or a manual process performed by quality control users.

Additionally, in accordance with an example embodiment, at step 204 each direct lesson 214 is tagged with 1) target audience, 2) subject, 3) education standard, 4) topic of interest, 5) difficulty level, 6) information transfer relevance score and 7) instructor and learner feedback. In accordance with an example embodiment of the present invention, the enrichment data staging area 100 provides the tags for the direct lessons 214. For example, the direct lessons 214 can be tagged with a subject (e.g. economics, health, sports, etc.). These tagged variables offer instructors the capability to optimize education content and learner engagement in ways not available in competitive products. In particular, the tags enable instructors to select content, through the direct lesson selection utility tool 300, which has the highest likelihood of success with individual learners or learner segments, as discussed in greater detail with respect to FIG. 4.

At step 206 the process 1200 determines whether the direct lesson 214 has been approved or rejected in the quality control step 204. If a direct lesson 214 is approved in the quality control step 204, the creator of the direct lesson 214 is notified by the system 1000 in step 206. If the direct lesson 214 is rejected and/or requires further enhancement, the system 1000 notifies the creator of the direct lesson 214 in the correction feedback in step 208. In particular, step 208 provides feedback that creators of direct lessons 214 need in order to make the required changes to bring the direct lesson 214 into compliance with the predetermined criteria. For example, the correction feedback provided at step 208 can indicate that the direct lesson 214 needs enhancements in the form of improved examples or exercises, additional instructions for the instructor, or major deviations/non-compliance with the predetermined criteria (e.g., set forth by the learning experience optimization methodology tool 500).

At step 210 a utility is provided by the process 1200 that allows the approved direct lessons 214 to be uploaded to the direct lesson data library 200. In particular, step 210 provides the manner by which direct lessons 214 are imported into the direct lesson Data Library 200. The direct lesson data library 200 contains all of the approved direct lessons 214 provided by the process 1200. The process 1200 provides instructors with access to a uniquely organized data library of education content that has the highest likelihood of both engaging learners and helping them understand the content (e.g., through the direct lesson selection utility tool 300). The direct lesson data library 200 is the starting variable in the present invention as it relates to optimizing the education content-learner engagement-performance pathways.

Continuing with FIG. 3, the process 1200 can include an optional step 212. At step 212 an education technology tool is implemented, which allows third party developers of education content (video, adaptive learning program, games, audio) to benefit from the various aspects of the present invention. The traditional methodology for creating any form of education content is to create it, make it available to the market as a one-size-fits-all solution to a wide audience (e.g. $5^{th}$ grade math) and measure student academic outcomes. However, the education content-learner engagement-performance pathways are not known. They can't answer the question, "With which learners or learner segments does my product work best or worst and why?" Third party developers can utilize the present invention as a tool to determine content-learner engagement-performance pathways for their products, thereby empowering them with insights they can use to more narrowly align their products with specific learners or learner segments, which in turn drives business sales, marketing, product development and refinement.

In accordance with an example embodiment of the present invention, third party developers utilize a content innovator portal configured to provide evaluation information back to the third party developer. In particular, the third party content is provided as an available direct lesson alternative to instructors. When the third party content has been utilized, the content is evaluated in the same manner as the direct lessons created through the process 1500. The evaluation data is available to the third party developer through the content innovator portal in real time. For example, the third party developer can log into the content innovator portal to see user rating (e.g., teacher and learner ratings) and performance metrics related to the content provided and utilized within the system 1000. As a result, with the optional step 212, the direct lesson data library 200 can include the uniquely created and approved direct lessons 214 and third party developers lessons to be utilized by instructors in a similar manner throughout the other components of the system 1000 (e.g., components 300, 400, 600, 700, 800, 900).

Once direct lessons 214 are stored in the direct lesson data library 200, the direct lessons 214 can be accessed and filtered by instructors through the direct lesson selection utility tool 300. In accordance with an example embodiment of the present invention, in operation, the direct lesson selection utility tool 300 is an online portal for instructors to retrieve direct lessons 214 from the direct lesson data library 200. The instructors enter the online web portal application using their personal login credentials (e.g., identification and password). Thereafter the instructors can navigate to the direct lesson selection utility tool 300 and manipulate a series of filters (e.g., drop down boxes), which is derived based on the type of content being used. The instructor utilizes the direct lesson selection utility tool 300 to make a selection of variables that produce a list of optimized direct lessons 214. Thereafter, the instructor can review the provided direct lessons 214 for selection and implementation just as they would any other in preparation for class.

As discussed with respect to FIG. 3, direct lessons 214 provided by the direct lesson selection utility tool 300 contain a unique feature of being tagged by topics of general interest to learners. When the tags are coupled with the information transfer relevancy score, as discussed with respect to FIG. 4, instructors have two important and new variables that they can use to select content that are of interest and relevance to their audience. The direct lesson selection utility tool 300 provides instructors with access to direct lessons 214 in a manner to leverage these variables in a manner to provide the best potential results to their target audience (e.g., target audience with particular interests and characteristics). In particular, the direct lesson selection utility tool 300 provides the process 1300 by which instructors access the direct lessons 214 stored within the direct lesson data library 200 and identify a subset of those direct lessons 214 that has the highest likelihood of both; 1) engaging a given target audience (based on audience interests) and 2) having the highest performance outcomes (based on an Information Transfer Relevancy Score).

Figure 4:
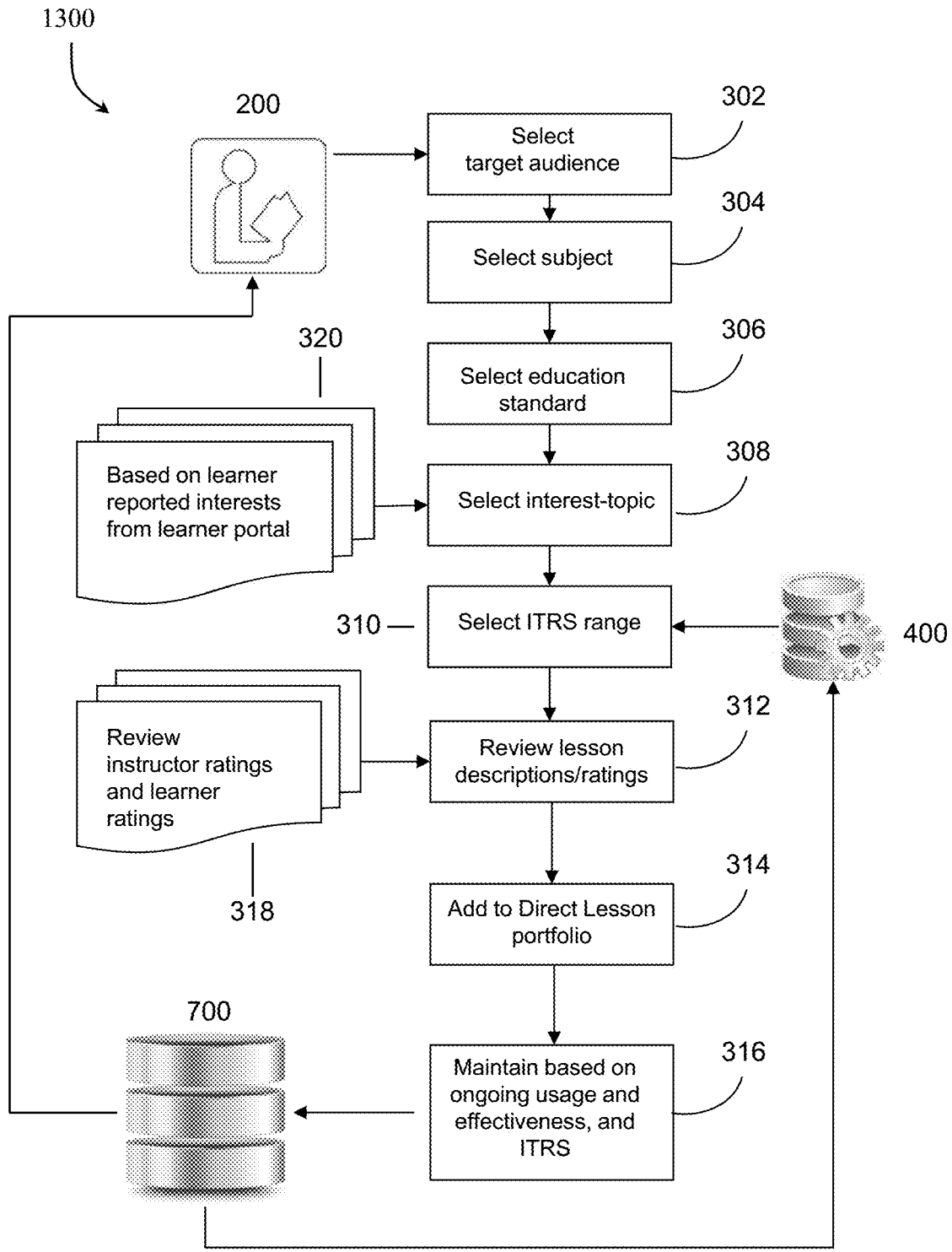
FIG. 4 is an illustrative flowchart depicting operation of a direct lesson selection utility tool, in accordance with aspects of the invention.

FIG. 4 depicts an exemplary example of the process 1300 by which instructors can access, filter, and select the direct lessons 214 most suitable for their target audience. As would be appreciated by one of skill in the art, the process 1300 can be provided to instructors through any combination of software and hardware known in the art. For example, the process 1300 can be provided to instructors through an online website or an application installed on a personal computing device located remotely from the direct lesson data library 200 and other aspects of the system 1000 (e.g., the central database 700).

At step 302 the process 1300 prompts instructors to select a target audience and receives the selection of the target audience. For example, the selected target audience can be 6th grade. At step 304 the process 1300 prompts instructors to select a subject matter and receives the selection of the subject matter. For example, the selected subject matter can be the subject of math. At step 306 the process 1300 prompts instructors to select specific education standard and receives the selection of the specific education standard. For example, the selected educational standard can be linear equations.

At step 308 the process 1300 prompts instructors to select one or more interest to the student audience (e.g., as provided by student interest data 320) and receives the selection of the one or more interests. For example, the selected interests can be gas prices and economic growth. Using filter 308 (interests), instructors can select direct lessons 214 they know will be of interest to their learners. In accordance with an example embodiment of the present invention, the interests provided at step 308 can be populated by interests submitted by learners (e.g., via a learner access portal 600) and is stored as student interest data 320. Research shows that student engagement is a predictor of improved academic outcomes and by providing direct lessons 214 in accordance with student selected interests will improve student engagement.

Figure 5:
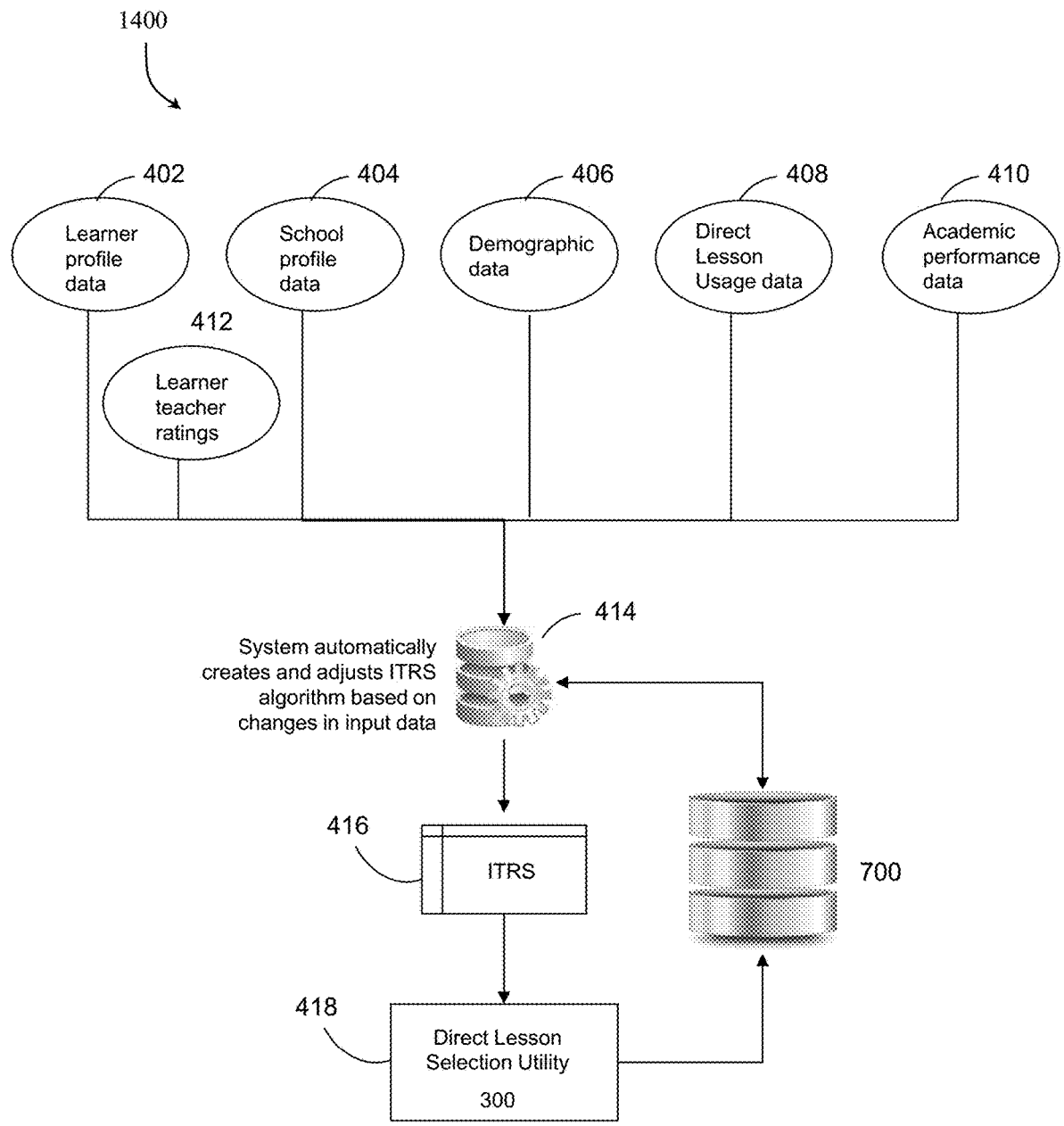
FIG. 5 is an illustrative flowchart depicting operation of an information transfer relevancy score processing tool, in accordance with aspects of the invention.

At step 310 the process 1300 prompts instructors to select an information transfer relevancy score range, which is generated by the information transfer relevancy score processing engine 400 as discussed in greater detail with respect to FIG. 5. For example, the selected information transfer relevancy score range can be scores of 8-10 out of a range of 1-10. Filter 310, the Information Transfer Relevancy Score, enables instructors to further refine their search for direct lessons 214 by selecting ones that have a demonstrated track record of success with learners that have similar profiles as those being taught by the instructors. As would be appreciated by one skilled in the art, not all direct lessons 214 will have a score as there may not be enough user information to generate one (e.g., new direct lessons 214), thus the step 310 may be left unselected. The combination of steps 308 and 310 increase the prospects for improved learner engagement and academic outcomes for a target audience. In particular, as discussed in greater detail in FIG. 5, as instructors use the direct lessons 214, the system 1000 captures the transactional data in the central database 700 and continually compare it to academic outcomes. The comparison data serves as in important input into the information transfer relevancy score processing engine 400. Thus, the system 1000 is self-learning and the scoring accuracy improves as more data are captured and analyzed.

Each of the steps 302-310 further narrows the pool of available direct lessons 214 provided by the direct lesson data library 200 based on the resulting selection. Additionally, each of the selections in steps 302-310 further dictates the options available in the subsequent step(s). For example, the selection of math in step 304 narrows the possible selection options presented to the instructor in step 306 to math related educational standards (e.g., linear equations, division, fractions, etc.). As would be appreciated by one skilled in the art, each of the selection criteria selected in steps 302-310 can be provided to the instructor utilizing any user interface known in the art. For example, the direct lesson selection utility tool 300 can include a series of drop-down boxes (one for each of steps 302, 304, 306, 308 and 310) that instructors use to narrow all of the direct lessons 214 in the direct lesson data library 200 to a subset of audience-relevant direct lessons 214.

At step 312 the process 1300 initiates an automated function that evaluates direct lesson tags (as provided by the enrichment stating area and associated with direct lessons 214 in the direct lesson data library 200) and compare them to the criteria selected by the instructor in steps 302-310. Matches are displayed for immediate review by the instructor for review. Any direct lessons 214 that are deemed appropriate by the instructor can be added to their personal portfolio maintained for the instructor by the system 1000 (e.g., in the central database 700). Additionally, in accordance with an example embodiment of the present invention, the instructor can utilize supplemental data 318 submitted by other users to determine whether a direct lesson 214 should be added to their personal portfolio. The supplemental data 318 is data that is provided by other users that have rated the displayed direct lessons 214 along with any additional feedback about the effectiveness of those direct lessons 214. For example, when submitting supplemental data 318 for direct lessons 214, users are instructed to provide their perspectives about why the direct lesson 214 was engaging and with which learner segment or segments.

At step 314 the process 1300 enables instructors to add a direct lesson 214 to their personal portfolio of direct lessons 214, whereby direct lessons 214 are saved for future deployment in actual instructional settings. For example, if the instructor finds that the direct lessons 214 have been effective with learners (e.g., based on the ITRS) and meet their target criteria, then the instructor can elect to add the direct lessons 214 to their personal portfolio. This step enables instructors the ability to create a personal library of direct lessons 214 that are specifically targeted to their audience of learners. This is in contrast to the one-size-fits-all conventional methodology that results in instructional material for mass audiences, and does not take into account audience interests or needs.

At step 316 the process 1300 maintains an active maintenance function allowing instructors to update direct lessons 214 prior to usage. The system 1000 can be configured to automatically notify instructors of data updates, new direct lessons 214 or updated performance data based on direct lesson profile of a given instructor's personal portfolio of direct lessons 214 located within their direct lesson data library 200. This means that any data tables used in the direct lesson 214 is refreshed with the latest data if available. As would be appreciated by one skilled in the art, the instructor can also manually initiate an update function. For example, the system 1000 enables instructors to update the source data used in any direct lesson 214 by clicking an update button. This feature then checks the enrichment data staging area 100 to determine if updated data are available, and then automatically updates any and all data tables, charts or graphs in the direct lesson 214.

Additionally, step 316 of the present invention enables instructors to maintain content over time and adjust their personal direct lesson portfolio as their target audience changes. For example, individual student interests will change as they progress from grade to grade and segments of learners will also change which thereby changes the education content-engagement-performance pathways. The invention equips instructors with data describing subtle changes via Insights 800 and also automatically adjusts the information transfer relevancy score as new data are always being entered into the transfer relevancy score processing engine 400 and the transfer relevancy score process 1400. In accordance with an example embodiment of the present invention, performance data for the direct lessons within the direct lesson portfolio such that instructors can track effectiveness of direct lessons and adjust direct lessons accordingly. In particular, the instructor can select a target threshold value for the academic performance of the direct lesson and if the performance data related to that direct lesson falls below that target threshold, the system 1000 provides an alert to the user. Furthermore, the system 1000 enables instructors to also have the option of removing a direct lesson 214 from their personal portfolio or placing it in suspension. The central database 700 collects all transactions made related to direct lessons 214 and the personal portfolio throughout the process 1300.

In accordance with an example embodiment of the present invention, each time a direct lesson is implemented by an instructor, the system 1000 will assign a unique identifier to that instance of the direct lesson. Thereafter, metrics related to that instance of the direct lesson (e.g., learner performance, learner ratings, etc.) can be tracked and associated with the direct lesson overall rating (e.g., ITRS). For example, based on a performance of an audience of learners matching a particular demographic/profile, the system 1000 can determine and provide an appropriate ITRS score for the direct lesson as it applies to future audiences matching the same demographic/profile. In other words, as future instructors go through the process 1500, the ITRS will be updated in real time to reflect how the direct lesson will perform for their audience based on historical data. This dynamic loop of data collection in real time is designed to continuously 1) optimize learner engagement and performance outcomes in real time, 2) ensure education content evolve to meet changing audience needs and interests, as well as local, state, country changes, and 3) make insights derived from the data available to instructors at all levels.

Continuing the discussions from FIG. 1 and FIG. 4, in accordance with an example embodiment of the present invention, the system 1000 provides an information transfer relevancy score processing engine 400 configured to provide an information transfer relevancy score (ITRS) to be associated direct lessons 214. The ITRS provides a unique indicator for a level of effectiveness that a direct lesson 214 may have with a target audience. In particular, the ITRS solves a growing problem that results from placing large libraries of educational lessons online, which is the challenge of determining which lessons will have the greatest positive impact on any given learner or learner segments (engagement and performance). For example, in a conventional education content provider, one can initiate a search using the online filtering process and select middle school math. The system will then return 1,066 lessons in which the instructor has no way of knowing which lessons will work best with his/her student audience. Accordingly, instructors are required to guess at what might work, which in the long run is costly and often shows little return on investment.

The information transfer relevancy score processing engine 400 is configured to assign an ITRS to every direct lesson 214. For example, each direct lesson 214 can be associated with an ITRS number from 1-10, where 10 indicates highest engagement-performance outcomes for a given learner segment. The information transfer relevancy score processing engine 400 scores a direct lesson 214 with a high number when it has been quantifiably demonstrated by data that shows the direct lesson 214 in question works with a given audience (engagement and performance). All other direct lessons 214 receive lower scores or no score at all if not enough data are available to generate a score.

In accordance with an example embodiment of the present invention, the demonstration data is based at least in part on performance metrics for learners collected from instructors who previously utilized the direct lesson 214 with those learners. For example, the performance of learners (e.g., testing) and the utilization of direct lessons 214 with those learners are tracked over time to establish a historical record of both student performance and direct lesson 214 usage. Thereafter, a correlation of performance to which direct lessons 214 where utilized prior to performance changes can be tracked by the system and an ITRS can be associated with those direct lessons 214. The more frequently that direct lessons 214 are used by a population of instructors the more accurate the ITRS becomes over time. As the ITRS becomes more accurate, the more telling the ITRS is as a filter to narrow down a search for direct lessons 214 that will likely engage a target student audience to improve academic performance of those learners. In other words, the system 1000 can track which direct lessons 214 can be correlated to improved and/or declined student performance and associate an appropriate ITRS with those direct lessons 214.

FIG. 5 is a flowchart that depicts a process 1400 for how the ITRS score is generated and used to drive the selection process of direct lessons 214. Initially, the transfer relevancy score processing engine 400 aggregates data from a variety of sources. In accordance with an example embodiment of the present invention, the data sources include student profile data 402, school profile data 404, demographic data 406, direct lesson usage data 408, academic performance data 410, and student teach ratings 412 of the direct lessons. As would be appreciated by one skilled in the art, the data aggregated data 402, 404, 406, 408, 410 and 412 by the transfer relevancy score processing engine 400 is tracked by the system 1000 over time and is available in the enrichment data staging area and the central database 700. In particular, input data for 402-412 are sourced from the enrichment data staging area 100 and/or the central database 700 on a pre-defined schedule (e.g., daily, weekly or another defined time frame).

At step 414 the aggregated data is combined to produce ITRS for each applicable direct lesson 214. Every direct lesson 214 has as many scores 416 as there are audience segments. In accordance with an example embodiment of the present invention, transfer relevancy score processing engine 400 assigns a score for every direct lesson 214 for as many times as there are audience segments (e.g., each usage of the direct lesson 214 with a target audience). For example, if the direct lesson data library 200 has one-hundred direct lessons 214 and the customer base (e.g., instructors) has fifty segments, there will be a total of five-thousand (100*50=5,000) individual ITRS' that require processing. For each direct lesson 214, all available scores will be averaged to create a single ITRS for that direct lesson 214. Every time the ITRS process 1400 is executed, new ITRS' will be assigned and old ITRS' will be captured in the central database 700 as historical data. The historical view of ITRS' has great value as they show the changing nature of the utility and value of direct lessons 214 over time for every audience segment, which in turn enables instructors to manage and optimize their personal portfolio of direct lessons 214 in their profiles.

In accordance with an example embodiment of the present invention, the ITRS' are derived by an information transfer relevancy score algorithm at step 414. The algorithm is created by deploying a number of scoring algorithms, such as linear regression, neural networks and others, and averaging the result, or through test-control evaluation, determine which modeling approach is most predictive. Once scores are assigned, the system automatically updates the central database 700 so that instructors can access the newest score from the direct lesson selection utility tool 300, as discussed with respect to FIG. 4.

At step 416 instructors access the ITRS via the direct lesson selection utility tool 300 as depicted in step 481 of FIG. 5 and step 310 in FIG. 4. Additionally, the ITRS' can optionally include scores for third party products. This enables the invention to be used as a service for content developers as they seek to determine for which learner segments the product has shown to be effective or not effective. Overall, the process 1400 makes use of the scoring algorithms to transform one-size-fits-all educational content into tag-enabled direct lessons 214 whereby instructors can gain a thorough understanding of the education content-learner engagement-performance pathways for all learners and learner segments. Conventional products that offer educational content are limited only to basic filtering that does not include the ability to filter based on audience parameters such as engagement, interests, past usage data and learner profiles.

In accordance with an example embodiment of the present invention, and as discussed with respect to FIG. 2, the learning experience optimization methodology tool 500 is used by education content developers to create direct lessons 214 that instructors access in the direct lesson selection utility tool 300. The education content that is developed using learning experience optimization methodology tool 500 results in direct lessons 214 that are targeted to specific subsets of the entire audience. For example, the profile data of the target audience could be female, African American, urban school, Texas, interest in U.S. spending habits of 20-25 year old people, and reduced lunch fee payments. Using this profile data, the learning experience optimization methodology tool 500 requires developers to think about their target audience before they develop the content, and it requires the developer to follow a specific format. The end product is a direct lesson 214 that instructors use to create highly engaging learning experiences that the target audience describes as useful and relevant, and more importantly learning experiences that can be directly analyzed for performance outcomes. Not every direct lesson 214 will engage a target audience, therefore, presents a great opportunity to collect data and seek insights that can be used to better align education content with the needs and interests of learners.

The learning experience optimization methodology tool 500 provides a process 1500 in which education content (e.g., direct lessons 214) can be linked to specific audience segments and related to particular audience interests and content relevancy. The audience segments are defined by data analysts evaluating school profile and demographic data, which are sourced from the enrichment data staging area 100. The learning experience optimization methodology tool 500 creates or accesses education content that optimize learner engagement and performance, thereby ensuring the most productive learner-instructor relationship for each and every learner. The optimized learner engagement is ensured because the learning experience optimization methodology tool 500 directs content developers to develop education content (e.g., direct lessons 214), that are tagged with identifiers (e.g., audience characteristics, interests, etc.) that are later used to segment a library of direct lessons 214 into groups aligned with interests of specific audience segments.

FIG. 6 depicts a flowchart depicting how the learning experience optimization methodology tool 500 is implemented in the creation of direct lessons 214 in accordance with the present invention.

At step 502 the learning experience optimization methodology tool 500 requires the content developer to clearly identify their target audience for the direct lesson 214 being created. The identification of the target audience is stored in the direct lesson data library 200. In particular, when creation of the direct lesson 214 is completed, the direct lesson 214 is tagged with the identified target audience for use by the other components of the system 1000. The identification of the target audience improves the likelihood that the content of the direct lesson 214 will be of interest to the learners using the content. Additionally, when implemented, the system 1000 is able to determine if the content works with the target audience in question, as discussed in greater detail herein, but it also determines other target audiences for whom the content works.

At step 504 the learning experience optimization methodology tool 500 initiates the process of creating the direct lesson 214 itself. The learning experience optimization methodology tool 500 directs the content developer to think about identified target audience, possible interests the learners have and then write a thought-provoking question that will immediately engage learners. The resulting question is associated with the identified target audience from step 502 and stored in the direct lesson data library 200 in a format that is viewable to instructors in the direct lesson selection utility tool 300.

At step 506 the learning experience optimization methodology tool 500 provides the content developer with a selection of authentic numeric data, which illuminates the thought-provoking question from step 504, from the enrichment data staging area 100. For example, the provided raw numbers are used to develop math problems, exercises and homework, etc. related to the direct lesson 214. The authentic data enhances learning experiences for learners by providing a logical and contextual foundation for learning and understanding educational concepts. When there is authentic numeric data available to answer the created question, the process 1500 advances to step 510.

If no authentic numeric data is available, the process 1500 advances to step 508. At step 508 the content developer is instructed to consider a new question or send an email to an administrator to find new data to be added to the enrichment data staging area 100 to associate with the existing question and will return to step 504. If it is learned that instructors desire data to support a given thought-provoking question 504, the business entity now has a way of learning of this requirement and then acting upon it by searching for data, creating new direct lessons 214 and informing the instructor if/when new direct lessons 214 and supporting data are available.

At step 510 the learning experience optimization methodology tool 500 instructs the developer to create actual exercises or activities for learners or segments of learners to participate within the direct lesson 214. Exercises and activities will vary with level of difficulty and it is in this part of the development whereby the difficulty level or levels are selected.

At step 514 the learning experience optimization methodology tool 500 instructs the content developer to make a decision about how the content (e.g., direct lesson 214) will be used. In accordance with an example embodiment of the present invention, the decision can be either that the content will be used for homework or for in-class work. If the content developer selects homework, the process 1500 will advance to step 516, otherwise if in-class work was selected the process 1500 will advance to step 526.

At steps 516 and 526 the learning experience optimization methodology tool 500 requires the content developer to determine any new terms that need to be defined for the direct lesson 214 and/or questions. If so, a vocabulary listing needs to be provided with clear, age-appropriate definitions for those terms. The defined terms from steps 516 and 526 offer an all-inclusive learning experience for learners whereby they see multiple subjects being used at once to create a useful and relevant learning experience, thereby increasing the value of an "education."

At steps 518 and 528 the learning experience optimization methodology tool 500 defines value propositions for the target audience as it relates to the direct lesson 214. In particular, the learning experience optimization methodology tool 500 requires the content developer to write a short passage that explains why the learner should be interested in the question. The value propositions are designed to answer the question, "Why is this important to me?" This engagement component is critical as it drives student feedback data to be utilized by the system 1000 to help determine effectiveness of the direct lesson 214 at a later point in time.

At steps 520 and 530 are instructions about how to use the lesson and maximize its effectiveness. In particular, the learning experience optimization methodology tool 500 requires the content developer to write instructions that provide the information necessary to facilitate the use of the direct lessons 214 and maximizing outcomes for optimal learning experiences.

Step 532 is only for in-class assignments whereby there is a "call to action." In particular, the learning experience optimization methodology tool 500 requires the content developer to write a dialog to engage with learners to provide an opportunity to apply what the learners have learned from the direct lesson 214 in a useful and meaningful way thereby increasing personal value of learned concepts. In other words, the call to action is an application of what was learned. It answers the question, "How do I use this in my daily to make my life or the lives of others better in some way?" As would be appreciated by one skilled in the art, not every direct lesson 214 will have a call to action and it may be omitted at the discretion of the content developer.

At steps 522 and 534 the learning experience optimization methodology tool 500 requires the content developer to write a summary of the learning experience. In particular, the learning experience optimization methodology tool 500 requires the content developer to write a re-cap, which links education standard to value proposition which is a clear explanation as to why the learning experience was relevant to the audience and how the knowledge can be used in a useful, productive way. The intent of the summary is that it should be designed to engage the class in a 3-5 minute discussion about a problem, issue, or challenge that is being faced by their local community, state, country or the world. This is an opportunity for the instructor to clearly explain how the learned concept(s) revealed something useful and relevant to the audience. This ensures that personal value at the learner level is being experienced. An example of this is a discussion would be about how fractions are used to understand fractal distillation of crude oil and how one barrel of oil produces a variety of different products used by people. Dialog can be enriched even further when comparing to "in-the-news" topics that contain references to crude oil. This educational experience can then lead to other direct lessons in other subjects (e.g. English, social studies, science).

At steps 524 and 536 the learning experience optimization methodology tool 500 requires the developer to tie the learning experience to standardized testing (e.g., MCASS, PISA, PARCC-like problems). In particular, every direct lesson 214 concludes with the option for learners to complete a short quiz as defined in steps 524 and 536 (e.g., performed via the learner access portal 600). The results of the standardized testing will be aggregated and maintained by the system 1000 to track performance metrics of the learners as it related to the direct lessons 214 associated with the testing. With this capability, it is now possible to thoroughly analyze the education content-learner engagement-performance pathway for every learner or segments of learners. The resulting data can be used immediately by instructors to adjust the direct lessons 214 to target improvement areas in the education content-learner engagement-performance pathways for individual learners or segments of learners. Additionally, the steps 524 and 536 can optionally be constructed with a wide range of educational applications including traditional instructional assessment, adaptive learning or animated-based applications.

Continuing with FIG. 1, the central database 700 provides a centralized storage system for storing all of the data for each of the other components 100, 200, 300, 400, 500, 600, 700, 900 within the system 1000. In particular, the central database 700 is the central repository of all data transactions within the system 1000. The central database 700 receives data input from the enrichment data staging area 100, the direct lesson data library 200, the direct lesson selection utility tool 300, the information transfer relevancy score processing engine 400, and the learner access portal 600, as discussed in greater detail herein. The learning experience optimization methodology tool 500 is used to drive the creation of education content located in the direct lesson data library 200. From the central database 700, data flows to an insight dashboard 800 for data visualization and analytics, as discussed in greater detail herein. Additionally, the communications interface 900 leverages data within the central database 700 to drive communication with users.

In accordance with an example embodiment of the present invention, the central database 700 constantly updates data stored thereon for each data transactions within the system 1000. Anytime an instructor or learner accesses the system 1000 (e.g., the direct lesson data library 200, the direct lesson selection utility tool 300, the learner access portal 600, email exchanges through the communications interface 900), the system 1000 collects data about that transaction and stores it as a record associated with the user. Accordingly, the central database 700 is a transaction database that stores all the transactions that users make with the system as it relates to the quantification of the usefulness and relevance of direct lessons 214 for individual learners or learner segments. As would be appreciated by one skilled in the art, the data transactions can be stored utilizing any combination of methods and systems known in the art. For example, the data is stored in tables using any one of the database tools known in the art.

In accordance with an example embodiment of the present invention, the transactional data is used to develop a full historical view of all users and how users interact with the invention to improve desired performance outcomes. In this sense, the central database 700 is highly dynamic and captures subtle changes in education content usefulness, relevance and performance, which in turn, is presented back to instructors as insights needed to adjust teaching in real time.

In operation, the central database 700 automatically interfaces with all of the component inputs into the system 1000 and collects, in real time, transactional data and stores data for access by those components. As would be appreciated by one skilled in the art, each of the components 100, 200, 300, 400, 500, 600, 700, 900 generate and access different types of data stored within the central database 700. Example of how each of the components 100, 200, 300, 400, 500, 600, 700, 900 interacts with the central database 700 are provided below. Processed data from the enrichment data staging area 100 are imported into tables within the central database 700. Programmers maintain the tables, add new ones and develop code to conduct quality control during the update process. Frequency of update is real time or as often as the data are updated, which may be daily, weekly or monthly. Direct lesson data (parts of direct lessons 214) are stored in tables within the central database 700. For example, direct lessons 214 created utilizing the learning experience optimization methodology tool 500 are stored in the central database 700. Together, they constitute the foundation on which the direct lesson Data Library 200 is constructed. Direct lessons 214 that are created and added to the direct lesson data library 200, have their components stored in the Central Database 700 in the form of data.

Usage data from the direct lesson selection utility tool 300 is transactional data that is also stored within the central database 700 at the user level. In particular, the central database 700 is used to capture transactional data that results from how instructors and learners access the direct lesson data library 200. For example, a transaction is recorded every time 1) an instructor views a direct lesson 214 in the direct lesson data library 200, 2) downloads a direct lesson 214 to their direct lesson library portfolio via the direct lesson selection utility tool 300, or 3) updates a direct lesson 214 in their personal portfolio of direct lessons 214 in the direct lesson selection utility tool 300. Additionally, the central database 700 stores all performance data (quiz and test problems) that are linked to one or more direct lessons 214. For example, every time an instructor uses the direct lesson selection utility tool 300, either click stream or actual selection data is collected and stored within the central database 700. As discussed with respect to FIGS. 4 and 5, every direct lesson 214 has a score tied to a segment of learners. For example, if there are seven learner segments and three direct lessons 214, there are a total of twenty-one total scores (e.g., 7*3=21)—one for each learner segment/direct lesson 214 relationship. The central database 700 captures historical scores for each learner segment/direct lesson 214 relationship so that analysis can be performed.

The central database 700 further enables learners to access, view, and interact with direct lessons 214 and the data related to the direct lessons 214 via the learner access portal 600. In particular, the learner access portal 600 utilizes data from the central database 700 as an information generator by converting the raw usage data into actionable information via insights 800 to deploy a wide range of statistical tools. The learner access portal 600 is configured to display the data stored within the central database in a user readable format and can be conveyed as a graphical user interface constructed as a website, or a mobile app, a computer application, etc. that can be accessed via any computing device that has Internet access (e.g., a computer, phone or tablet).

In accordance with an example embodiment of the present invention, the learner access portal 600 is the source of data from learners around 1) their topic and occupational/industry interests, 2) survey reviews of direct lessons 214 in the direct lesson data library 200, 3) self-reported profile data for the enrichment data staging area 100, 4) performance data also for the enrichment data staging area 100, and 5) what types of datasets they access in the central database 700, which received data from the enrichment data staging area 100. For example, the learner access portal 600 is where learners can do the following: 1) access data created as a result of the enrichment data staging area 100 to analyze and evaluate it for some purpose as determined by the instructor, a direct lesson 214 or out of curiosity, 2) perform homework assignments, 3) Fill out surveys about their learning experiences with direct lessons 214, and 4) provide user-defined profile data. The learner access portal 600 receives all input data from the central database 700 in processed form, along with direct lessons 214 and problem solving activities. Results of performance-based testing access through the learner access portal 600 are returned back to the central database 700 for storage at the learner level. All learner transactional data (surveys, direct lesson 214 feedback and rating, interests) are exported to the central database 700 for storage.

Furthermore, the access data from the enrichment data staging area 100 via the central database 700 enables learners the ability to explore the same data that is being used in the direct lessons 214. This permits learners to capitalize on their curiosities and take learning experiences to a new level. The learner access portal 600 differs from traditional content at least in part because it enables, encourages and incents learners to actively provide their perspectives about the education content they are learning. Traditional products do not incorporate learner perspectives or profiles into their development thereby contributing to the one-size-fits-all end product. In contrast, the learner access portal 600 enables learners to provide active feedback about their experiences with education content and it enables learners to inform how instructors deliver the content by providing the instructors with useful, valuable information about topics of interests, needs, occupation interests, etc. As would be appreciated by one skilled in the art, the feedback can be user submitted as a response to specific questions or can be open ended. For example, the learner access portal 600 can prompt the learner with specific questions such as "is the learning experience interesting to you?", "can you apply what you learned to your life now?", "did the learning experience help you to understand the educational concept?" etc. Each response to the example questions can be binary values (e.g., yes no) that are trackable (as the answers relate to the direct lesson 214 prompting the question) by the system 1000.

In accordance with an example embodiment of the present invention, the resulting data from user (e.g., students or learners) interaction with the learner access portal 600 is evaluated by other users (e.g., instructors) via insights 800, as discussed in greater detail herein. The utilization of the results data from the learner access portal 600 enables the other users to view direct lesson 214 effectiveness in real-time for each and every learner or segments of learners, and adjust direct lesson 214 usage in real time. In particular, the learner access portal 600 uses learner transactional data to create insights 800 that instructor users then utilize to align content with individual learners and learner segments. The instructors can also utilize the learner access portal 600 as a tool to perform online quizzes and tests, which are directly tied to direct lessons 214. This capability enables the system 1000 to capture performance data so that the education content-learner engagement-performance pathways can be clearly identified and evaluated, and improved as deemed necessary. Such transactional data from learner access portal 600 also drives the information transfer relevancy score processing engine 400 to determine ITRS'. In particular, the data resulting from user (e.g., students or learners) interactions with the learner access portal 600 is then used as additional data inputs for the ITRS to make the scores more accurate, as discussed in FIGS. 4 and 5.

Figure 7:
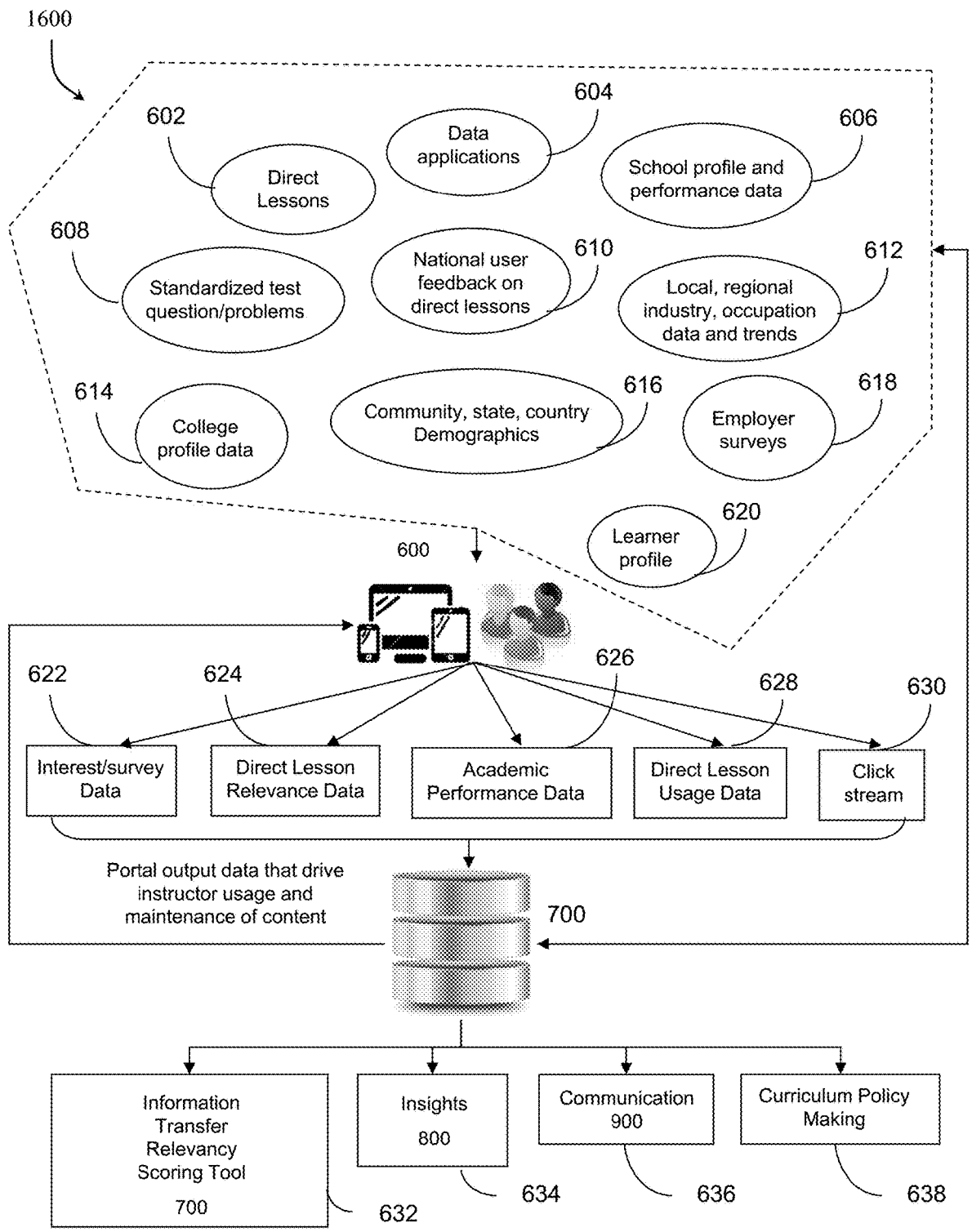
FIG. 7 is an illustrative flowchart depicting operation of learner access portal, in accordance with aspects of the invention.

FIG. 7 depicts a flowchart for a process 1600 of an exemplary operation of the learner access portal 600, which enables learners to access authentic numeric data applications, direct lessons 214, and provide information to instructors regarding the personal usefulness and relevancy of education content.

At steps 602-620 input data is collected within the learner access portal 600 from the central database 700 and from the users of the system 1000. In particular, the learner access portal 600 is constantly importing and displaying data from data sources from each of the steps 602-620. The exact data fields and processed data that are displayed within the learner access portal 600 are dynamic and vary from learner segment to learner segment. In other words, one segment of learners may value a group of data differently than another group, therefore, the data that is displayed in the user interface or learner access portal 600 dashboard of each user has a dynamic, user-driven capability that allows them to select variables of their choosing. Additionally, as raw data from the data sources in steps 602-620 are updated, the learner access portal 600 updates the displayed information in real-time.

At step 602 direct lessons 214 are provided to learners through the learner access portal 600. In particular, the student learners are provided with a user interface that allows learners to access education content anywhere at any time. For example, learners are able to login to the learner access portal 600 and access any direct lessons 214 made available by their instructor, as discussed with respect to FIG. 4.

At step 604 data is aggregated from data access portals to specific datasets that are worthy of a separate data tool. In particular, data from the direct lessons 214 are aggregated from one or more data sources (e.g., URLs), as discussed with respect to step 104 of FIG. 4. For example, at step 604, data is aggregated from a United States database that has an extensive dataset on the 630,000+ bridges across the country. Data applications will grow in number and add another layer of functionality to the learning experience created by direct lessons 214. Similarly, at step 604, the learner access portal 600 collects usage data around how learners and profiles of learners use the data applications, as discussed with respect to step 102 of FIG. 4. The learner usage and feedback provide yet another layer of valuable information as instructors seek to optimize the education content-learner engagement-performance pathways of learners and segments of learners.

At step 606 school profile and performance data is aggregated for display on the learner access portal 600. In particular, data is provided to show how learners in a given school are performing as it relates to specific performance data within the system 1000. The purpose of which is to encourage learners to embrace academic success and want to succeed. Again, this means we answer the question, "why is this important to me as a learner to know?". In contrast, competing educational content is only developed to convey education standards, whether the learner "likes it" or not.

At step 608 standardized test questions from national and international tests are aggregated and are linked to direct lessons 214 in the direct lesson data library 200. The tests and test questions provide a context to real world application for the associated direct lessons 214, thereby engaging learners and helping them understand the connection between learning, practice and testing and personal value of learned concepts. In contrast, modern testing is performed in a vacuum without any direct connection to real world application. An example of this is taking a driver's test without ever driving a car, which would make no sense to a learner. Furthermore, learners in driving school are motivated to succeed on tests because success leads to a driver's license and the ability to drive. The invention is designed to create the same feelings, except with traditional learning concepts in schools.

At step 610 all usage data connected to direct lessons 214 is aggregated for display by the learner access portal 600. The usage data for each direct lesson 214 is provided to learners through the learner access portal 600 to enable the learners to learn about what other learners think about the direct lessons 214 from a value and utility perspective. In other words, the learner access portal 600 provides information around the meaningful activities other learners did as a result of the direct lesson 214. This type of information spurs learners to be creative and try things in their own communities.

At step 612 industry and occupational trend data is aggregated for display by the learner access portal 600. In particular, industry and occupational trend data includes related to industries and careers within a predetermined area (whether defined by instructor or student), educational requirements for those industries and careers, and the direct lessons 214 that apply to those areas. The industry and occupational trend data will help learners to deeply understand the jobs that reside within a given radius from their community. In accordance with an example embodiment of the present invention, learners can adjust the radius (for example, 10 miles versus 15 miles) to view changes in industries and occupations as they expand it from their location. This helps learners view the specific jobs that are found in the defined community, which in turn helps them plan for their future as they become more knowledgeable about the educational requirements of the jobs of their liking. Furthermore, direct lessons 214 make frequent reference to occupations; therefore, requiring learners to utilize this aspect of the learner access portal 600.

A step 614 data related educational establishments and programs are aggregated for display by the learner access portal 600. In particular, data related to where certain educational requirements or opportunities are aggregated. For example, as learners ascertain information about occupations in their communities and needed educational requirements, they also want to know where one obtains the additional higher education. The invention seamlessly connects these elements together (direct lessons 214, occupations and industry, and higher education) within the Learner Access Portal 600 so that learners possess the ability to experience their education in superior ways as compared to traditional content.

At step 616 select demographic data is aggregated for display by the learner access portal 600. Learners can make the connection between local occupations and the people that not only fulfill the jobs, but also the people served by the occupations. Combined, the data provide learners with a greater understanding of their unique community-occupational/industry profile. All this information is provided so young learners are far more informed and prepared to drive their future and experience success and happiness with their lives.

At step 618 employer survey data (e.g. National Association of Colleges and Employers) is aggregated for display by the learner access portal 600. The employer survey data offers additional valuable information about the constantly changing needs and trends of United States employers. This is an additional data source that is useful and valuable to young learners as they plan for their futures. Furthermore, the data also serve as input into the creation of direct lessons 214, thereby giving purpose to learned concepts.

At step 620 profile data for each student user is aggregated. The profile data can either be self-reported or provided as an input feed from the education institution. The data aggregated at steps 602-620 represents the source data for learners to combine a wide range of information into one place that connects learning to real world usage and application. The learner access portal 600 is configured to access and display all the aggregated information in a meaningful way. The goal is for learners to want to go to the learner access portal 600 instead of "having to go", thus improving the motivation of learners to participate in direct lessons 214. As would be appreciated by one skilled in the art, a wide range of data inputs can be aggregated beyond the data aggregated in steps 602-620. The type and quantity of data are only limited by the exploration and evaluation of the data within the context of the question, "does the data have the potential to increase learner engagement and usage of the learner access portal 600?"

Continuing with FIG. 7, steps 622-630 of the process 1600 are steps in which collections of data are created as a result of learner interaction with the learner access portal 600. In particular, the data created and collected at steps 622-630 are stored in the central database 700 for utilization by the insights 800. The collected data provides the data to instructors to more deeply understand what their learner interests are and which direct lessons 214 that the learners are actually using that lead to academic success (e.g., through insights 800). Once these unique pathways are identified, they can be reinforced by the instructors during class activities.

At step 622 data is created in response to student users submitting one or more interests and responding to a survey about which direct lessons 214 are useful and valuable. This capability to directly engage learners and respond to their needs and interests is not found in conventional educational materials. In particular, data collected from step 622 can influence how the curriculum at school (or otherwise) is purchased, implemented, maintained and taught on their behalf, all the time. Furthermore, the system learns, via analysis of transactional data, which direct lessons 214 are useful and valuable to specific learner profiles and segments of learners.

At step 624 data is created in response to learners providing relevancy data after completing a direct lesson 214. The relevancy data becomes another input for school officials (instructors) to make sure that the curriculum at school (or otherwise) is purchased, implemented, maintained and taught on the behalf of their learners, and in real-time.

At step 626 academic performance data is provided based around any testing activity stored within the learner access portal 600. In accordance with an example embodiment of the present invention, the academic performance data is designed only to provide directional information to the learner based on third party evaluations (e.g., instructor, teacher, standardized testing, etc.) and is not designed to give the student or learner a grade or rank them in some capacity to themselves or any other learner or segments of learners. For example, the learner access portal 600 can provide academic performance data by flagging/adding fractions as a suggested area of improvement to improve specific academic standards in a particular area based on the past performance of the learner (e.g., as evaluated by the instructor or teacher). As would be appreciated by one skilled in the art, the system 1000 can automatically grade standardized tests and provide instant academic performance data through the learner access portal 600. For example, the system 1000 can automatically grade a multiple choice test and provide areas of focus to the learner for improving future test scores/understanding in that subject.

At step 628 the learner access portal 600 tracks and provides data to reflect which learners are accessing which direct lessons 214. The relationships between learners and the direct lessons 214 they choose yield valuable information needed to not only create future direct lessons 214, but to share with the local education institution about what learners are doing on their own time. These relationships are unique across the country to individual learners and segments of learners.

At step 630 the learner access portal 600 tracks and provides click stream data that shows how learners are navigating through the learner access portal 600. The goal is to gather information about potential problem areas so that they can be addressed and the overall user experience improved and optimized. It is important to note that the "optimized" user experience will vary from learner to learner and this reality is incorporated into the design.

The output data tracked, created, or otherwise provided by the learner access portal 600 in steps 622-630 is stored in the central database 700 for a wide range of functions, primarily to support steps 632-638 (e.g., the information transfer relevancy score processing engine 400, insights 800, communications interface 900 and to send summarized/processed data from the learner access portal 600 back to the learner access portal 600 for learners to review and evaluate). In particular, the learner access portal 600 captures transaction data from steps 622-630 and export it to the central database 700 for analysis via insights 800. In accordance with an example embodiment of the present invention, this is an automated function that occurs as learners interface with the learner access portal 600.

Continuing with FIG. 7, steps 632-638 of the process 1600 are steps in which transactional data is tracked, created, or otherwise provided by the learner access portal 600 are shared and utilized by other components of the system 1000.

At step 632 is where data elements are provided to the information transfer relevancy score processing engine 400 for determining the ITRS. For example, if a given learner segment is having academic success with a given combination of direct lessons 214, then that data feeds the information transfer relevancy score processing engine 400 and influences the ITRS rating for that direct lesson 214 in a positive way (e.g., establish an initial high ITRS rating or increase an existing ITRS rating).

At step 634 is where data elements are provided to the insights 800 to drive decision making for instructors. For example, based on the feedback provided by the learners utilizing the learner access portal 600, the data can inform educators how instructors purchase, implement, maintain and teach education content on the behalf of learners, all the time.

At step 636 is where data elements from the learner access portal 600 drives a variety of ad hoc and email triggers for communications interface 900 based on the information from insights 800. For example, if the introduction of a new occupation in a given community becomes apparent (as a result of a new company moving there), then the presence of such information is an opportunity for instructors to communicate it to the local school system and to learners.

At step 638 information from the learner access portal 600 drives decision making about education policy at the local, state and Federal levels. For example, if the Massachusetts Department of Education has discovered, via output from the learner access portal 600 that learners in another state are having great success utilizing the learner access portal 600 in a particular way, officials in the State of Massachusetts may wish to leverage those initiatives and adjust educational policy accordingly. In other words, the learner access portal 600 (student voice) becomes a new source of information that can be used to drive education policy.

Example operations of the learner access portal 600 is provide herein, however, as would be appreciated by one skilled in the art, the operations of the learner access portal 600 is not limited to the example operations provided herein. Initially, learners log into the learner access portal 600 using their personal credentials. Upon entering, they are able to perform the following activities.

In a first activity, the learner can access and interact with direct lessons 214. The learner can select direct lessons 214 of their choosing or select ones that have been assigned by the instructor. The learner access portal 600 tracks which learners have completed the assignments associated with assigned direct lessons 214 and which learners have not. This is accomplished by learners selecting from an instructor-defined list of activities for each direct lesson 214. The learner selects the activity and once completed with the direct lesson(s) 214 assigned, the learner hits submit, which notifies the instructor that the particular learner has completed the work and the performance results for that learner on the activities. The learner access portal 600 also tracks and stores the results in the central database 700 for future display in the learner access portal 600.

In a second activity, the learner can access a list of "Dashboard Variables" from which they can display on the home page of the learner access portal 600. Learners are able to customize their respective learner access portal 600 home pages including selecting which data elements or links to reports, data tables, charts or graphs that they define as interesting to display. The data elements or pre-canned reports are sourced from data from steps 602-620. As would be appreciated by one skilled in the art, not all variables will be available to the learner for selection.

In a third activity, learners have a section on their learner access portal 600 home page for providing response data for direct lessons 214 and to define their interests. These data elements are the primary manner in which learners "voice" their opinions about how well the curriculum is being purchased, implemented, maintained and taught on their behalf. The resulting data is presented on the instructor learner access portal 600/insights 800 dashboard so that they can optimize the education content-learner engagement-performance pathways for individual learners as needed. It is important to note that this functionality does not exist in products already in the market. Furthermore, the rating of direct lessons 214 by learners is available for all learners within the database. This application of social networking enables learners to see how other learners are benefiting from direct lessons 214.

In a fourth activity, another section of the learner access portal 600 homepage includes links to data applications. Learners are able to choose from a list of data applications to further personalize the learner access portal 600. Data applications enable learners to access large datasets for research or in support of personal goals. For example, a data application can be offered for occupational data.

In a fifth activity, learners have the ability to apply learned concepts within the context of standardized national and international testing. For example, the learners can select a subject or point of interest and select standardized test to take, which is recorded, evaluated, and stored by the learner access portal 600. As would be appreciated by one skilled in the art, the testing available can be selected and/or assigned by an instructor as part of a direct lesson 214. This activity generates performance data that illuminates the entire education content-learner engagement-performance pathways for all learners.

Continuing with FIG. 1, in accordance with an example embodiment of the present invention, transactional data from the learner access portal 600 and the central database 700 are summarized and sent to user dashboards of both instructors and learners. The summarized dashboard data are presented as insights 800 that are made available so instructors can optimize the entire education content-learner engagement-performance pathways for all learners or segments of learners. In particular, the insights 800 enable users with the ability to view data in their efforts to evaluate content effectiveness and ensure it is always optimized for each learner, which in turn, influences how instructors access and download content via the direct lesson selection utility tool 300.

The insights 800 are collections of data provided in a manner designed to present the education content-learner engagement-performance pathways in a visual way that is appealing, relevant and highly actionable to each instructor, and to also summarize them so that they become a valuable source for education policy makers at the local, state and federal level. In operation, the insights 800 retrieve predefined transactional datasets from the central database 700 and using a combination of data visualization software, transform the data into relevant information. The resulting insights are evaluated by instructors to ensure education content-relevancy-performance relationships are optimized for each learner or segments of learners. In particular, the insights 800 are where instructors go to view data in the form of actionable insights. The system 1000 is configured to illuminate the relationship between content relevancy and user performance via the collection, aggregation and dissemination of data that describe the numerous and distinct relationships.

As would be appreciated by one skilled in the art, within the insights 800, the users can have different levels of authorization to view different levels of data. For example, using personal login credentials, they are able to explore education content-learner engagement-performance pathways for their specific education institution. Users with expanded levels of authorization are able explore combinations of education institutions (e.g. school districts, regions, states, or the country). Users login into the proposed invention using the Internet and a device that connects to the Internet. Once they have entered the system, users can review their dashboard, run pre-defined reports and contact support for ad hoc reporting needs.

In accordance with an example embodiment of the present invention, insights 800 can include a special user account for non-instructors (e.g., superintendents, school board members, government officials, content providers, etc.). The education data has a host of possible users that include media, politicians, higher education, government officials and businesses. Business interests lie in the need to determine where best to move or open a place of work to get the best future employees. The data about learner interests helps business leaders align their interests with those of future workers. Therefore, the system 1000 is developed in such a way that the insights 800 are made for a wide range of audiences. Additionally, furthermore, third party providers of education content have their own login credentials as they seek to determine the effectiveness of their products with specific learners or segments of learners.

In accordance with an example embodiment of the present invention, the system 1000 can provide a chief academic officer portal where metrics and performance data for a single educational establishment, a plurality of educational establishments, regions of educational establishments, etc. can be visualized. The chief academic officer portal includes a "settings" section whereby parameters for success metric goals for a curriculum can be created. By setting these parameters and then comparing the values to real world values in the district, the user (e.g., the chief academic officer) can evaluate whether the curriculum is optimized at the educational establishment(s) at any given moment. The goal metrics can include, but are not limited to target direct lessons utilized, total learning experiences rated for those direct lessons, student performance metrics for those direct lessons, and student feedback for those lessons (e.g., yes or no answer to "how do you rate your learning experience?"). Based on a level of variance values of real world values compared to the parameters set by the user, then the appropriate educational establishment and/or instructor is notified in their respective insight dashboard (e.g., by the color of an engine light icon). For example, the dashboard can show a green, yellow, or red engine icon based on the variance values exceeding the set parameters, meeting the parameters, or falling short of the parameters, respectively. Using this approach, one will have clear performance indicators that are always being measured.

Continuing with FIG. 1, the system 1000 is configured to provide a communications interface 900 for relaying data and information to the various users of the system 1000. In particular, the communications interface 900 enables sharing of data among learners, instructors, content developers, administrations, and other users based on the insights presented within the interface, which direct lessons 214 are working and with which target audience, and any updates are performed within data stored within the central database 700. The central database 700 offers a rich source of actionable information that serves as a basis for relevant communication during product usage. For example, the communications interface 900 can communicate when updates have been performed in the data enrichment staging area 100, when an ITRS is updated for a specific learner segment, when new direct lessons 214 are added, when new datasets are added, when executive reporting is complete as a result of the insights 800, etc. As would be appreciated by one skilled in the art, the amount and type of communications transmitted to a user can be based on user defined preferences, administrative settings, or a combination thereof.

In operation, communications interface 900 is used to send relevant messages to instructors and learners. The messages can take the form of automated trigger messages or opportunistic ad hoc messages including emails, dashboard information posts, message board posts, and reporting for both learners and instructor. The trigger messages are sent automatically once a predefined trigger threshold has been met. An example of a triggered message is one that goes to instructors that have used a direct lesson 214 incorporating a dataset that has just been refreshed with new data. Inversely, ad hoc messages can be sent during opportunistic events that may arise due to a variety of reasons. For example, if a major earthquake happened, the business using the invention may wish to send an ad hoc email to instructors that have used direct lessons 214 with earthquake data. The ad hoc email message would let the instructors know that the data have been updated to reflect the recent world event. Overall, the communications interface 900 is the component used to help instructors better connect direct lessons 214 with up to date real world information, thereby increasing content relevancy, and making a more interesting and exciting learning experience for the learner, which in turn can be measured and evaluated as presented herein.

In accordance with an example embodiment of the present invention, trigger communications are automatically initiated by the system 1000 when certain "triggers" are met, including but not limited to: anytime the data supporting direct lessons 214 in an instructors' portfolio are updated, a message is sent, when a new direct lesson 214 is added to the direct lesson data library 200 and the topic is the same as one in the portfolio of direct lessons 214, an email is sent letting those instructors know of its creation, when an Information Transfer Relevancy Score changes for a given direct lesson 214, instructors that store that lesson in their personal portfolio of direct lessons 214 are notified of the new score, if a learner-driven "Like" rating for a given direct lesson 214 changes, an email is sent to instructors that store that direct lesson 214 in their personal portfolio of direct lessons 214, if a new category of topics is created, an email is sent to instructors, trigger emails are sent when the professional development library of videos is updated with a new video, annual email is sent to instructors asking them to view their dashboard and understand learner interests and how they may have changed since the previous year. Insights from the present invention are highlighted in the message, annual email is sent to instructors asking them to view their dashboard to look at community occupations and historical trends, and "Did you know" email series is sent to learners to help them link educational standards with how they are used in occupations.

In accordance with an example embodiment of the present invention, ad hoc communications are automatically initiated by the system 1000 when one-time opportunistic messages that have relevance to learner or instructor segments, including but not limited to: news events linked to certain direct lessons 214 prompt an ad hoc email. For example, if the unemployment rate changes significantly in a given community or state, an email is sent. Often, these emails will coincide with local news to bring reality and relevance to the message. Email will highlight direct lessons 214 that evaluate unemployment data, system enhancements that bring added functionality to both instructors and learners result in an ad hoc email, and introduction of a new occupation or significant change in outlook for a given occupation results in an ad hoc email and only goes to those areas of the country affected.

In accordance with an example embodiment of the present invention, dashboard communications are automatically initiated by the system 1000 when detailing, illustrating and sharing information about education content-Learner Engagement-Performance pathways. This aspect of the invention is where all the transactional data from the Central Database 700 are shared with learners, instructors and third party users of the invention in their efforts to determine the success of their products by learner segments. Examples of dashboard communications include but are not limited to: "In the news" tied to direct lessons 214 (local, state, regional, country), which touts the relevance of direct lessons 214 and learned concepts, country by country comparison for standardized testing, changes in occupational trends at the country level, changes in educational trends at the country level, and raw data is used by developers to create industry reports and other messaging of trends.

In accordance with an example embodiment of the present invention, the system 1000 can track and record how users respond to communication. In particular, system 1000 captures, in the form of transactional response data how learners and instructors respond to communications in the central database 700. The response data are used for a variety of purposes including modeling, predictive analysis and refinement of the overall communication effort, tools used, and structure, and overall efficacy.

Figure 8:
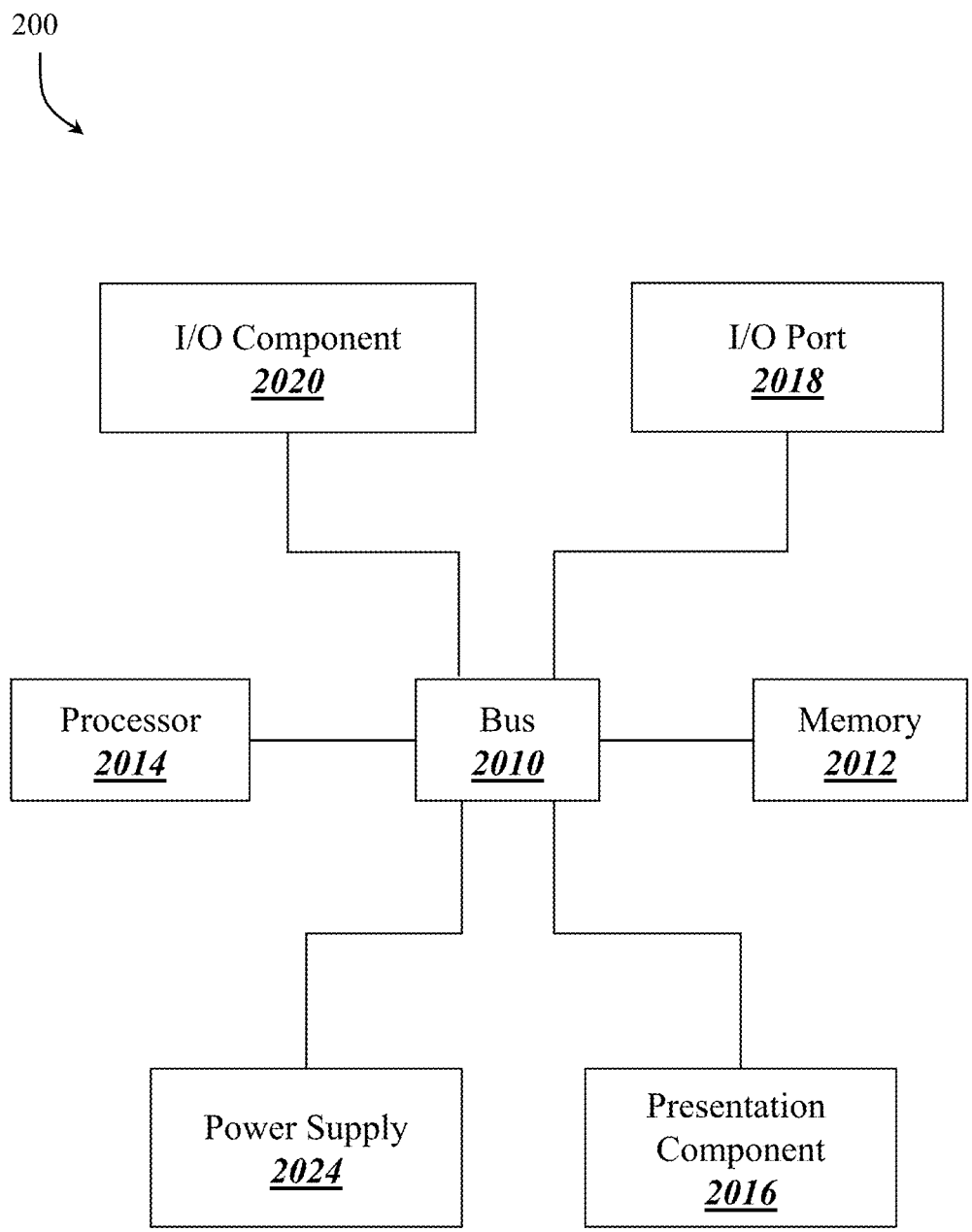
FIG. 8 is a diagrammatic illustration of a high level architecture for implementing processes in accordance with aspects of the invention.

Any suitable computing device can be used to implement the components 100, 200, 300, 400, 600, 700, 800, 900 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 2000 is depicted in FIG. 8. The computing device 2000 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 2000 is depicted for illustrative purposes, embodiments of the present invention may utilize any number of computing devices 2000 in any number of different ways to implement a single embodiment of the present invention. Accordingly, embodiments of the present invention are not limited to a single computing device 2000, as would be appreciated by one with skill in the art, nor are they limited to a single type of implementation or configuration of the example computing device 2000.

The computing device 2000 can include a bus 2010 that can be coupled to one or more of the following illustrative components, directly or indirectly: a memory 2012, one or more processors 2014, one or more presentation components 2016, input/output ports 2018, input/output components 2020, and a power supply 2024. One of skill in the art will appreciate that the bus 2010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 2000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 2000.

The memory 2012 can include computer-storage media in the form of volatile and/or nonvolatile memory. The memory 2012 may be removable, non-removable, or any combination thereof. Exemplary hardware devices are devices such as hard drives, solid-state memory, optical-disc drives, and the like. The computing device 2000 can include one or more processors that read data from components such as the memory 2012, the various I/O components 2016, etc. Presentation component(s) 2016 present data indications to a user or other device. Exemplary presentation components include a display device, speaker, printing component, vibrating component, etc.

The I/O ports 2018 can enable the computing device 2000 to be logically coupled to other devices, such as I/O components 2020. Some of the I/O components 2020 can be built into the computing device 2000. Examples of such I/O components 2020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

Example implementations of the present invention are provided in Appendix A herewith, the subject matter of which is hereby fully incorporated herein as forming a part of this provisional application.

What is claimed is:

1. A method for producing data for instructors to evaluate the effectiveness of education content in real time for a plurality of learners, the method comprising:
   aggregating and storing, by a processor, datasets of education provider data and educational related content in an enrichment data staging area;
   creating and storing, by a processor, a plurality of direct lessons in a direct lesson data library based on the datasets in the enrichment data staging area;
   classifying, by a processor, each of the plurality of direct lessons and associating each of the plurality of direct lessons with target audiences and identifiers;
   generating, by an information transfer relevancy score processing engine, an Information Transfer Relevancy Score (ITRS) scale for each direct lesson in the plurality of direct lessons;
   filtering and providing, by a processor, a filtered subset of the plurality of direct lessons for a target audience to a user through a direct lesson selection utility tool;
   providing, by a processor, access to the subset of the plurality of direct lessons to the target audience through a learner access portal;
   tracking and aggregating, by a processor, performance data and user feedback for the subset of the plurality of direct lessons from at least one of the user and users within the target audience;
   optimizing, by the processor, the ITRS scale for each direct lesson in real time based on the performance data and user feedback for the subset of the plurality of direct lessons;
   wherein aggregating and storing the datasets of education provider data and educational related content in an enrichment data staging area comprises:
      receiving uniform resource locator (URL) locations as source locations for the enrichment data staging area;
      automatically accessing the URL locations, on a periodic basis according to a predetermined update frequency, for numeric and non-numeric data to check for updates to previously aggregated datasets;
      when an update is available, downloading the newest dataset using an extract, load and transformation (ELT) process customized to each URL; and
   prior to the automatically accessing each URL locations, automatically checking to determine if the URL link is active and accurate, and, if the URL link is not active or accurate, providing a notification for corrective action;
   wherein the method further comprises determining optimal direct lessons in real-time, the determining comprising:
   aggregating direct lesson feedback data for one or more direct lessons from a plurality of remote participant audiences, the direct lesson feedback data comprising:
   participant audience descriptors, the participant audience descriptors defining classifications for the participant audience submitting the direct lesson feedback data for the one or more direct lessons;
   instructor ratings and student lessons for the one or more direct lessons; and performance data of the participant audience having conducted the one or more direct lessons;
wherein the direct lesson feedback data is based on input received in response to the participant audience conducting the one or more direct lessons;
evaluating a level of effectiveness of the one or more direct lessons based on a combination of, the instructor ratings, the student lessons, and the performance data;
receiving, from the user, a selection of a target audience, the target audience comprising predetermined participant audience descriptors;
providing, to a user, a plurality of criteria filters, each criteria filter comprising sub-criteria each associated with the one or more direct lessons;
receiving, from the user, a selection of a sub-criteria for each of the criteria filters;
applying the selected sub-criteria as filters to the one or more direct lessons;
providing, to the user, a filtered group of direct lessons from the one or more direct lessons based on the filters;
providing a relevancy score for each direct lesson in the filtered group of direct lessons, the relevancy score correlating the level of effectiveness to the direct lesson feedback data provided by participant audiences and academic performance data by the participant audiences sharing similar participant audience descriptors of the target audience;
receiving, from the user, a selection of a direct lesson from the filtered group of direct lessons; and
adding the direct lesson to a lesson portfolio associated with the user.

2. The method of claim 1, wherein generating the ITRS scale comprises:
aggregating student profile data, school profile data, community demographic data, and direct lesson usage data;
for each direct lesson, aggregating academic performance data, student ratings, and teacher ratings;
calculating an ITRS score for each direct lesson based on the student profile data, the school profile data, the demographic data, the direct lesson usage data, the academic performance data, the student ratings, and the teacher ratings; and
wherein the ITRS scale indicates a level of engagement-performance outcomes for a given direct lesson for a given student segment.

3. The method of claim 1, further comprising:
upon completion of the direct lesson, receiving new direct lesson feedback data from the user for the direct lesson; and
updating the direct lesson feedback data to include the new direct lesson feedback data.

4. The method of claim 3, further comprising:
receiving a target threshold value for the academic performance of the direct lesson; and
providing an alert to the user when the academic performance data for the direct lesson, based on the updating, falls below the target threshold value.

5. The method of claim 1, wherein filtering and providing the filtered subset of the plurality of direct lessons for the target audience comprises:
selecting a target audience for the lesson;
selecting a target subject matter;
selecting an educational standard for the target subject matter;
selecting at least one interest topic for at least one student of the plurality of learners;
selecting a difficulty level;
selecting a range of scores from an information transfer relevancy score (ITRS) scale;
selecting at least one direct lesson from a list of direct lessons automatically generated based on the target audience, the target subject matter, the educational standard, the at least one interest topic, and the range of scores; and
adding the at least one direct lesson to a lesson portfolio.

6. The method of claim 5, further comprising updating the at least one direct lesson with current data.

7. The method of claim 5, wherein the at least one interest topic is selected from a plurality of interest topics created based on student submitted interests.

8. The method of claim 5, further comprising:
rating, by at least one instructor, an effectiveness of the at least one direct lesson; and
ratings, by one or more learners, an effectiveness of the at least one direct lesson.

9. The method of claim 5, wherein the ITRS scale is a relevancy score based on the target audience, the target subject matter, the educational standard, the at least one interest topic and a level of effectiveness of direct lessons based at least in part on the rating provided by the at least one instructor and the ratings provided by the one or more learners, academic outcomes, and profile of schools who have had success with given direct lesson.

10. The method of claim 5, further comprising assigning a unique identifier to the at least one direct lesson, wherein the unique identifier is utilized to track each instance of the at least one direct lesson.

11. The method of claim 1, wherein the classifying each of the plurality of direct lessons comprises:
generating a plurality of target audience classifications;
receiving a selection of a target audience of the plurality of target audience classifications;
generating a plurality of target subject matters based on the received target audience;
receiving a selection of a target subject matter from the plurality of target subject matters;
generating a plurality of educational standards based on the target subject matter;
receiving a selection of an educational standard for the target subject matter;
generating a plurality of interest topics based on student reported interests;
receiving a selection of at least one interest topic for one or more target learners;
generating a plurality of ranges of scores for an information transfer relevancy score (ITRS) scale;
receiving a selection of a range of scores from the information transfer relevancy score (ITRS) scale;
generating a list of direct lessons based on the target audience, the target subject matter, the educational standard, the at least one interest topic, and the range of scores; and
receiving a selection of at least one direct lesson from the list of direct lessons.

12. The method of claim 1, wherein the identifiers include a target audience, a subject, an education standard, a topic of interest, a difficulty level, the information transfer relevance score and an instructor and learner feedback.

* * * * *